US010793250B2

(12) United States Patent
Georgeson et al.

(10) Patent No.: US 10,793,250 B2
(45) Date of Patent: Oct. 6, 2020

(54) APPARATUS CONFIGURED AS A STRUCTURE COMPRISING A SKIN INCLUDING A BOND WITHOUT A SPLICE PLATE

(71) Applicant: The Boeing Company, Chicago, IL (US)

(72) Inventors: Gary Ernest Georgeson, Tacoma, WA (US); Kenneth Harlan Griess, Kent, WA (US)

(73) Assignee: The Boeing Company, Chicago, IL (US)

( * ) Notice: Subject to any disclaimer, the term of this patent is extended or adjusted under 35 U.S.C. 154(b) by 489 days.

(21) Appl. No.: 15/385,122

(22) Filed: Dec. 20, 2016

(65) Prior Publication Data

US 2017/0100909 A1    Apr. 13, 2017

Related U.S. Application Data

(60) Division of application No. 14/510,736, filed on Oct. 9, 2014, now Pat. No. 9,522,512, which is a continuation-in-part of application No. 13/716,171, filed on Dec. 16, 2012, now Pat. No. 8,894,801, which is a division of application No. 12/857,835, filed on Aug. 17, 2010, now Pat. No. 8,652,606.

(51) Int. Cl.
*B64C 3/28* (2006.01)
*B64C 3/26* (2006.01)

(52) U.S. Cl.
CPC . *B64C 3/28* (2013.01); *B64C 3/26* (2013.01)

(58) Field of Classification Search
CPC .................................. B64C 3/26; B64C 3/28
See application file for complete search history.

(56) References Cited

U.S. PATENT DOCUMENTS

| 2,315,324 | A | * | 3/1943 | Gassner | B27D 1/08 |
|  |  |  |  |  | 244/123.1 |
| 4,110,501 | A |  | 8/1978 | Tarbell et al. |  |
| 4,284,443 | A | * | 8/1981 | Hilton | B31D 3/0207 |
|  |  |  |  |  | 156/60 |
| 5,429,326 | A |  | 7/1995 | Garesche et al. |  |
| 5,429,879 | A |  | 7/1995 | Syn et al. |  |
| 5,866,272 | A |  | 2/1999 | Westre et al. |  |
| 7,115,323 | B2 | * | 10/2006 | Westre | B32B 3/14 |
|  |  |  |  |  | 428/593 |
| 7,491,289 | B2 |  | 2/2009 | Westre et al. |  |

(Continued)

FOREIGN PATENT DOCUMENTS

| CN | 102066196 A | 5/2011 |
| JP | 2013533813 A | 8/2013 |

(Continued)

OTHER PUBLICATIONS

European Patent Office Communication Report, dated Oct. 19, 2018, regarding Application No. 15189048.0, 4 pages.

(Continued)

*Primary Examiner* — Jessica B Wong
(74) *Attorney, Agent, or Firm* — Yee & Associates, P.C.

(57) ABSTRACT

A composite structure comprises stacked sets of laminated fiber reinforced resin plies and metal sheets. Edges of the resin plies and metal sheets are interleaved to form a composite-to-metal joint connecting the resin plies with the metal sheets.

22 Claims, 13 Drawing Sheets

FIG. 12D

(56) References Cited

U.S. PATENT DOCUMENTS

| | | | |
|---|---|---|---|
| 9,522,512 | B2 | 12/2016 | Georgeson et al. |
| 2003/0080251 | A1 | 5/2003 | Anast |
| 2003/0168555 | A1* | 9/2003 | Livi ........................ B29C 70/44 244/132 |
| 2004/0134162 | A1 | 7/2004 | Douglas |
| 2007/0000596 | A1 | 1/2007 | Westre et al. |
| 2007/0154680 | A1 | 7/2007 | Escobar Benavides et al. |
| 2011/0206942 | A1 | 8/2011 | Patrick et al. |
| 2013/0343805 | A1 | 12/2013 | Neumann et al. |
| 2015/0024160 | A1 | 1/2015 | Georgeson et al. |
| 2017/0136757 | A1 | 5/2017 | Georgeson et al. |

FOREIGN PATENT DOCUMENTS

| | | |
|---|---|---|
| JP | 2013173949 A | 9/2013 |
| JP | 2013539428 A | 10/2013 |
| WO | WO2010031372 A1 | 3/2010 |

OTHER PUBLICATIONS

Final Office Action, dated Mar. 8, 2018, regarding U.S. Appl. No. 14/604,719, 18 pages.

The State Intellectual Property Office of the People's Republic of China, Notification of the First Office Action with English Translation, dated Feb. 1, 2019, regarding Application No. 2015106487769, 19 pages.

Office Action, dated Aug. 16, 2017, regarding U.S. Appl. No. 14/604,719, 53 pages.

Notice of Allowance, dated Nov. 8, 2017, regarding U.S. Appl. No. 15/384,767, 30 pages.

Office Action, dated Aug. 6, 2014, regarding U.S. Appl. No. 13/443,687, 42 pages.

Office Action, dated Mar. 30, 2016, regarding U.S. Appl. No. 14/510,736, 44 pages.

Notice of Allowance, dated Aug. 10, 2016, regarding U.S. Appl. No. 14/510,736, 12 pages.

Office Action, dated Mar. 31, 2017, regarding U.S. Appl. No. 15/384,767, 8 pages.

Notice of Allowance, dated Jun. 28, 2018, regarding U.S. Appl. No. 14/604,719, 12 pages.

Japanese Notice of Reasons for Rejection with English translation, dated Sep. 3, 2019, regarding Application No. 2015-190787, 6 pages.

Chinese Notification of the Second Office Action with English translation, dated Sep. 11, 2019, regarding Application No. 2015106487769.9, 9 pages.

* cited by examiner

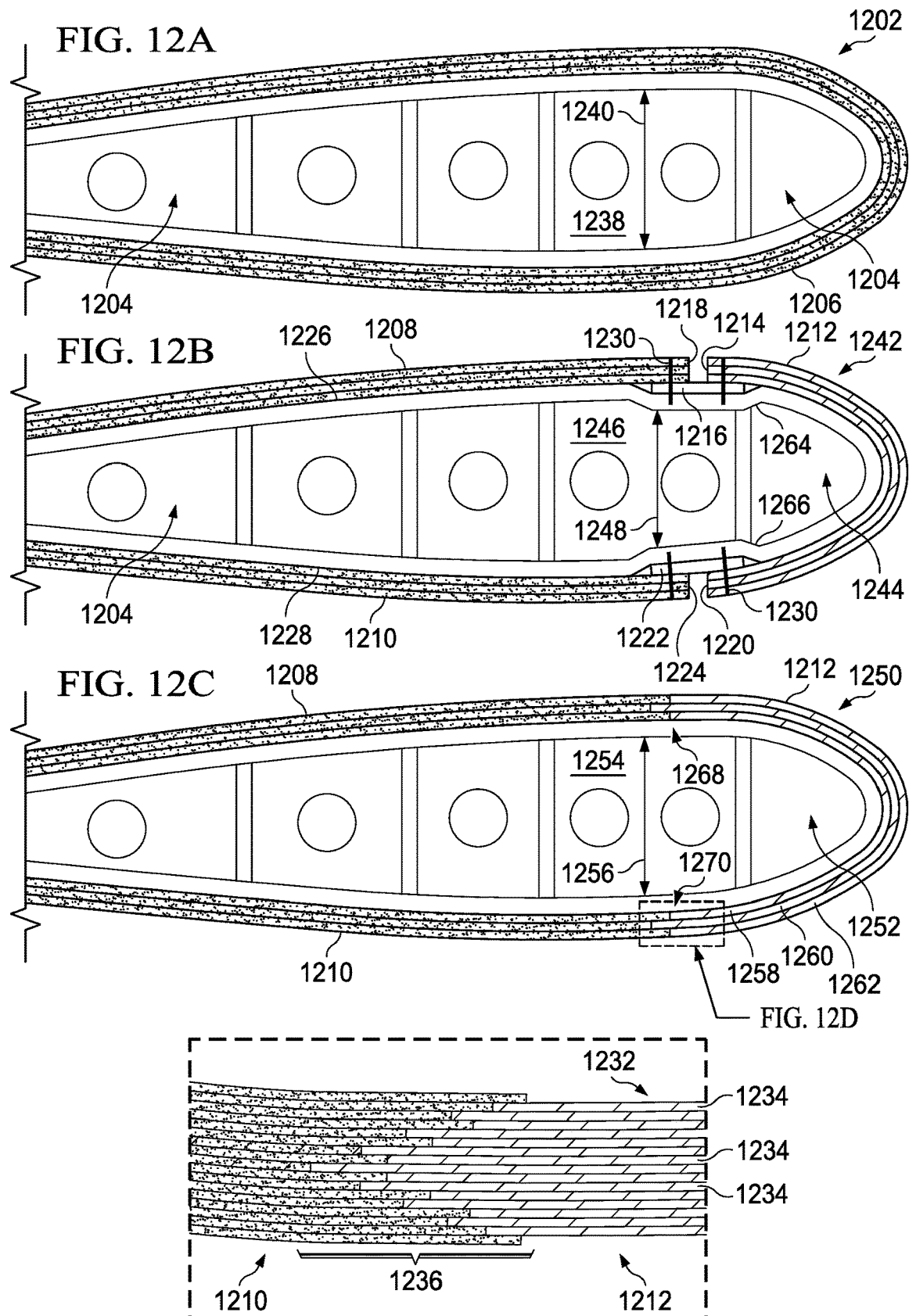

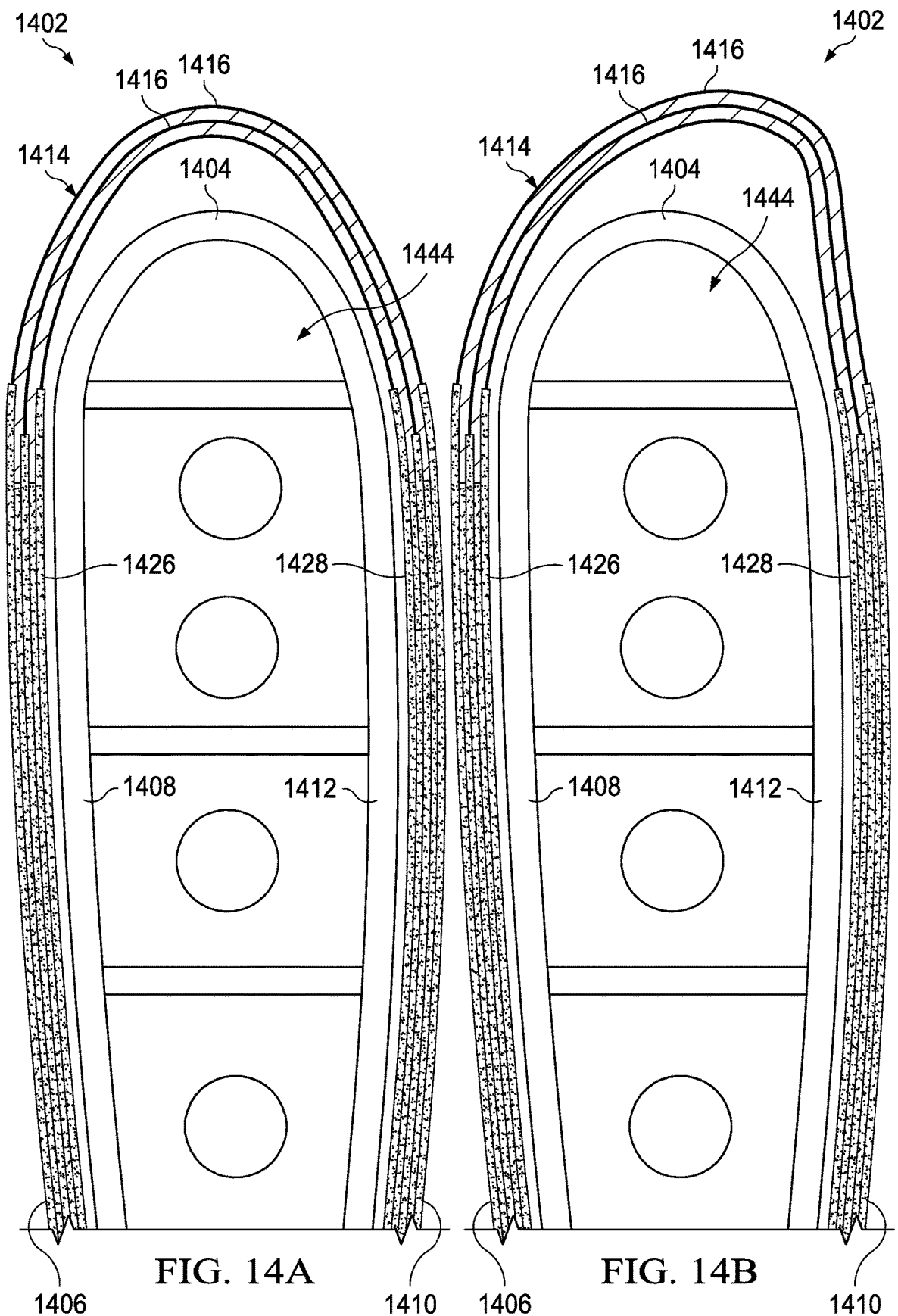

US 10,793,250 B2

APPARATUS CONFIGURED AS A STRUCTURE COMPRISING A SKIN INCLUDING A BOND WITHOUT A SPLICE PLATE

This application is a divisional application of U.S. patent application Ser. No. 14/510,736, filed Oct. 9, 2014, status, Issued as U.S. Pat. No. 9,522,512 on Dec. 20, 2016, which is a continuation-in-part of and claims the benefit of U.S. application Ser. No. 13/716,171, entitled "Composite Structures Having Composite-To-Metal Joints and Method for Making the Same," filed Dec. 16, 2012, status, Issued as U.S. Pat. No. 8,894,801 on Nov. 25, 2014. U.S. application Ser. No. 13/716,171 is a divisional application of U.S. application Ser. No. 12/857,835, entitled "Composite Structures Having Composite-To-Metal Joints and Method for Making the Same," filed Aug. 17, 2010, status, Issued as U.S. Pat. No. 8,652,606 on Feb. 18, 2014. Accordingly, this application incorporates the above referenced applications in their entirety.

TECHNICAL FIELD

This disclosure generally relates to composite structures, especially to fiber reinforced resin laminates, and deals more particularly with a hybrid composite having a composite-to-metal joint.

BACKGROUND

Bonding techniques are often used to assemble composite structures. In applications where the composite structure also requires fasteners, the local thickness or gauge of the structure surrounding the fastener may need to be increased in order to withstand loads transmitted through the fastener joint. As the local thickness of the structure increases, the fastener may need to be lengthened, thereby adding weight to the structure. Additionally, the increased local thickness of the structure may increase the eccentricity of the load path across the fastener joint, which may place undesired bending loads on the fastener.

One solution to the problems mentioned above consists of attaching metal fittings to the composite structure in the area of the fasteners. These metal fittings may be formed of titanium or similar metals that may not substantially chemically react with carbon fiber reinforced composites in which they are in contact. Titanium fittings, however may be relatively expensive, particularly when it is necessary to form them into complex shapes.

Accordingly, there is a need for a composite resin-to-metal joint that may be used to connect substantially all metal fittings with substantially all composite resin structures, which is relatively inexpensive and easy to manufacture, and which may withstand loads transferred around fastener connection points. There is also a need for a composite resin-to-metal joint that substantially avoids chemical reactions between the all metal fitting and the all composite resin structure.

SUMMARY

The disclosed embodiments provide a hybrid-type composite structure that includes a fiber reinforced resin composite-to-metal joint that may be used to connect a substantially all-metal fitting with a substantially all composite resin structure. The joint provides a transition between the composite and metallic structures that is suitable for use in higher performance applications, such as aerospace vehicles. This transition from a substantially all composite to a substantially all metal material may reduce or eliminate the possibility of corrosion and/or problems stemming from eccentricity. During lay-up of the composite structure, sheets of metal are substituted for a number of composite plies, and the transition from composite plies to metal sheets occurs at staggered locations so as to provide adequate load transfer from the composite portion to the metal portion. The staggered transition results in an interleaving between the composite plies and the metal sheets and creates multiple bond lines that may reduce the occurrence and/or propagation of cracks or disbonds in the joint. An adhesive placed between the metal sheets binds and unitizes the sheets into a nearly solid metal fitting.

According to one disclosed embodiment, a composite structure is provided, comprising a laminated stack of fiber reinforced resin plies and a stack of metal sheets. The metal sheets have edges that are interleaved with the edges of the fiber reinforced resin plies to form a composite-to-metal joint connecting the fiber reinforced resin plies with the metal sheets.

According to another embodiment, a hybrid resin-metal structure is provided comprising a composite resin portion, a metal portion, and a transition section between the resin and metal portions. The resin portion includes laminated plies of fiber reinforced resin, and the metal portion includes bonded sheets of metal. The transition section includes staggered overlaps between the laminated plies and the metal sheets.

According to another embodiment, a hybrid composite metal part is provided. The part comprises a layup of fiber reinforced composite material that is terminated at an interface location. At the interface location, a metal ply of the same thickness as the composite material continues to the metal edge of the part, and the layup is repeated with a composite to metal interface that is staggered toward the edge of the part from the prior interface location. A ply of structural adhesive is placed between the metal plies, with the next metal to composite interface staggered away from the part edge to produce a nested splice, and the staggered interface stacking produces nested tabs is continued to the full thickness of the part with none of the composite plies extending fully to the edge of the part.

According to still another embodiment, a method is provided of fabricating a composite structure. The method comprises forming a multi-ply composite lay-up having a composite portion and a metal portion, and forming a composite-to-metal joint between the composite portion and the metal portion. The method further includes compacting and curing the layup.

According to a further embodiment, a method is provided to produce a hybrid metal part. The method comprises laying at least one fiber reinforced composite ply that is terminated at a interface location, and laying an adjacent metal ply where the metal ply is of substantially the same thickness as the adjacent fiber reinforced composite ply. The steps of laying composite plies and adjacent metal plies are repeated to form a composite to metal interface that is staggered toward said an edge of the part from the prior interface location. The method further comprises laying a ply of structural adhesive between the metal plies, and repeating the composite and metal ply layup where the next metal to composite interface is staggered away from the part edge to produce a nested splice.

BRIEF DESCRIPTION OF THE ILLUSTRATIONS

FIG. 12A through FIG. 12D are illustrative embodiments depicting a cross-sectional side view of a structure formed by a frame and a skin that includes FIG. 12A, FIG. 12B, FIG. 12C, and FIG. 12D. FIG. 12A is a cross-sectional side view of a structure formed by a frame and a composite skin depicted in accordance with an illustrative embodiment; FIG. 12B is a cross-sectional side view of a structure including: a frame, a composite skin, a metal skin, and a splice plate connecting the metal skin to the composite skin depicted in accordance with an illustrative embodiment; FIG. 12C is a cross-sectional side view of a structure including composite skin connected to a metal skin depicted in accordance with an illustrative embodiment; FIG. 12D is a zoomed in cross-sectional side view of a connection of the metal skin to the composite skin on the structure depicted in FIG. 12C depicted in accordance with an illustrative embodiment.

Figures 13A, 13B:
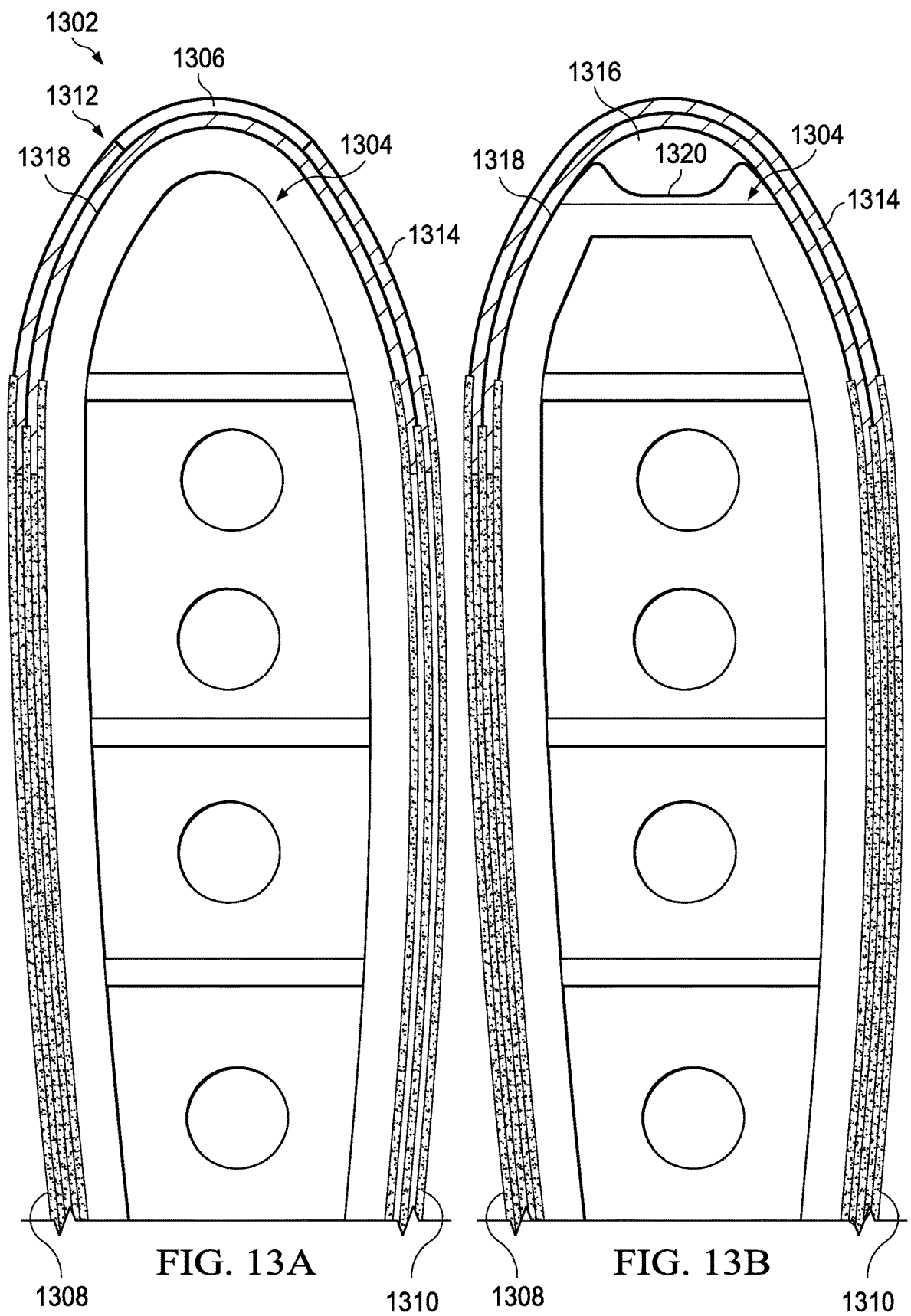

FIG. 13A is a cross-sectional side view of a structure similar to the structure depicted in FIG. 12C, but with conductive strip in a stack of metal sheets, depicted in accordance with an illustrative embodiment; FIG. 13B is a side cross-sectional view of a structure similar to the structure depicted in FIG. 12C, but with an integrated heating duct, depicted in accordance with an illustrative embodiment.

FIG. 14A is a cross-sectional side view of a structure similar to the structure depicted in FIG. 12C depicted in accordance with an illustrative embodiment; FIG. 14B is a cross-sectional side view of an illustrative embodiment the structure depicted in FIG. 14A, but differing from FIG. 14A by the stack of metal sheets changing its shape, depicted in accordance with an illustrative embodiment.

Figure 15:
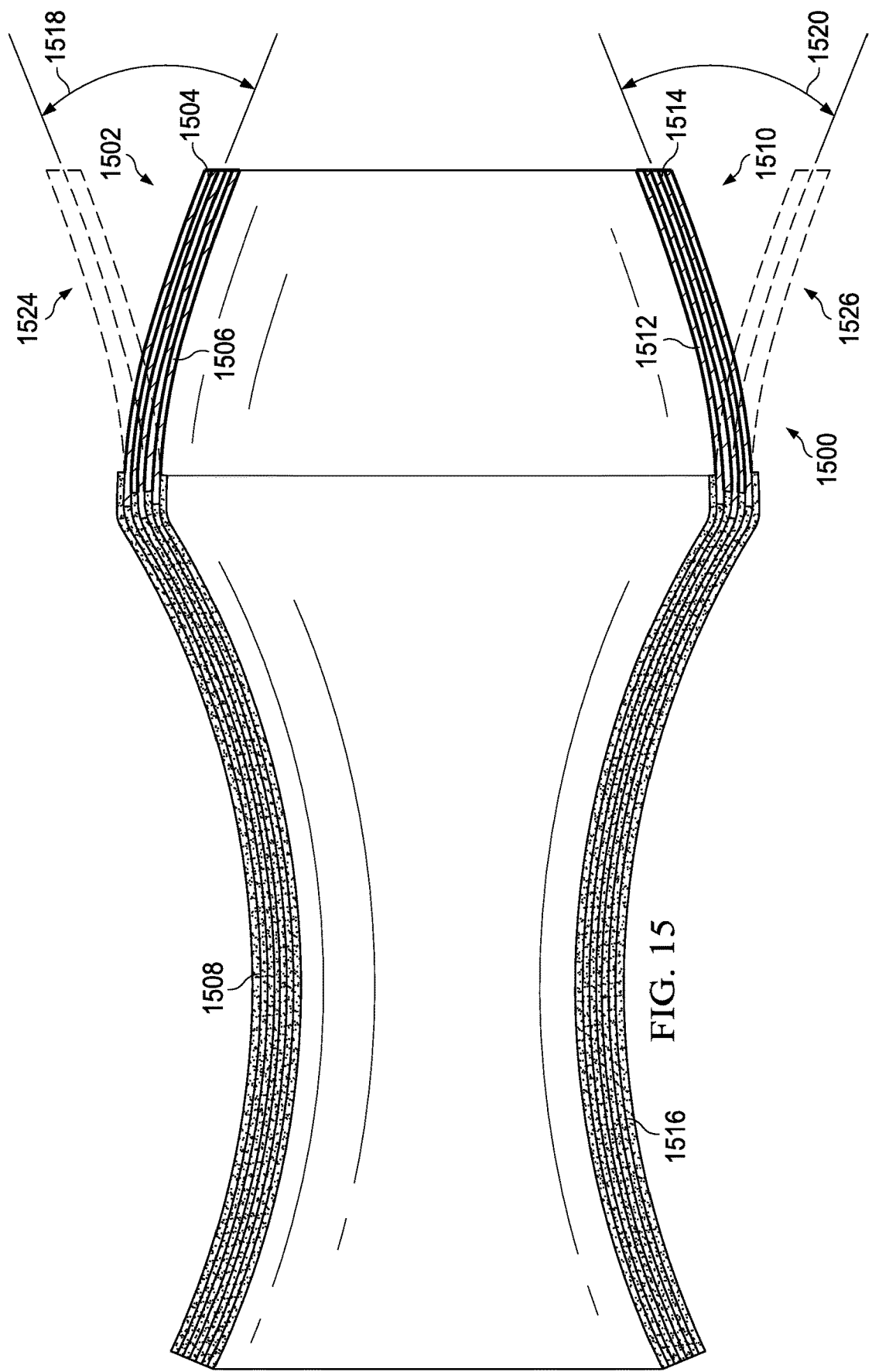

FIG. 15 is a cross-sectional side view of an engine with a nozzle containing a memory shape alloy connected to a composite engine turbine section cowl depicted in accordance with an illustrative embodiment.

Figure 16:
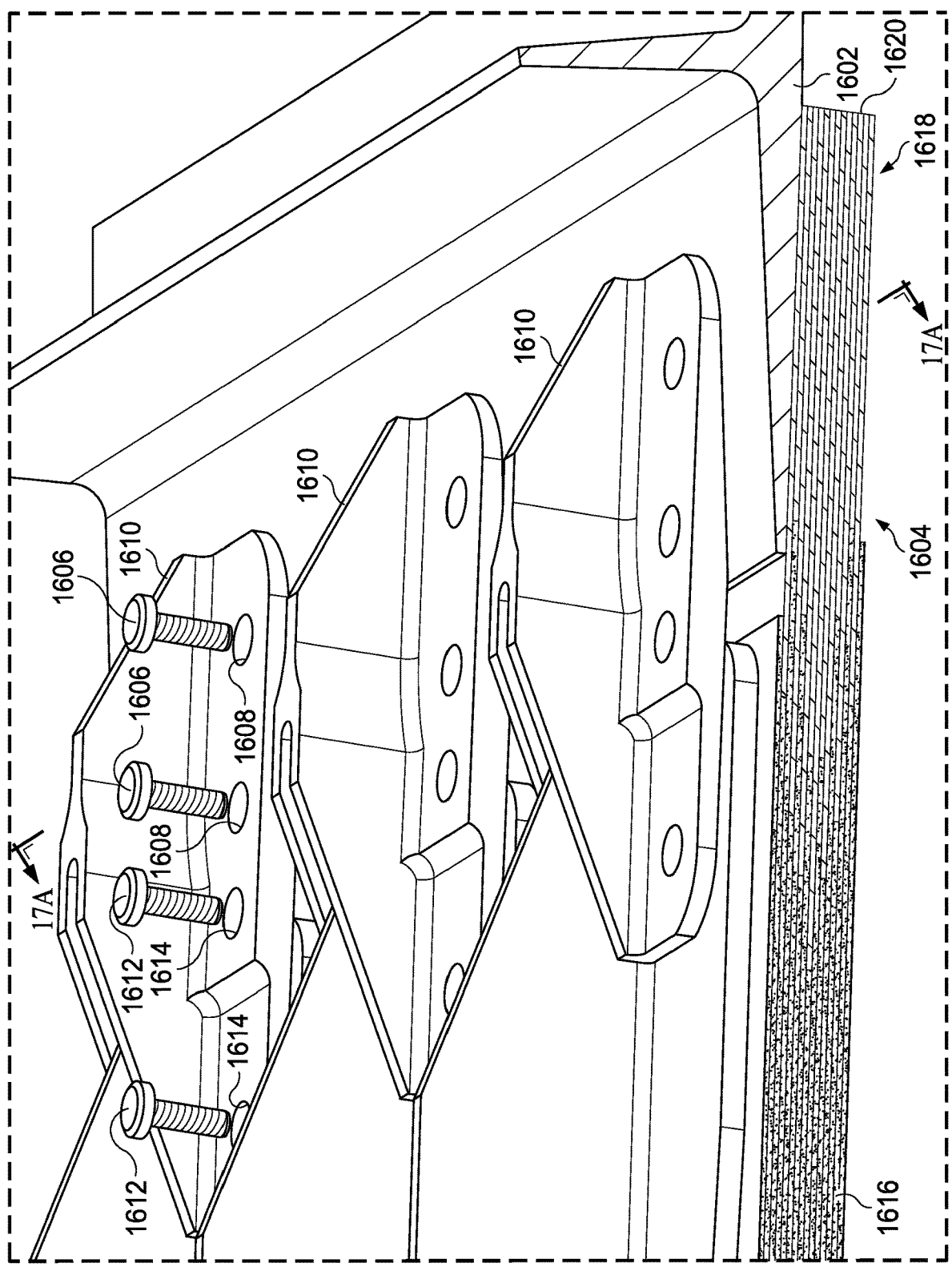

FIG. 16 is a perspective view of a titanium-composite ply joint connecting an aluminum structure to a composite structure depicted in accordance with an illustrative embodiment.

Figure 17A:
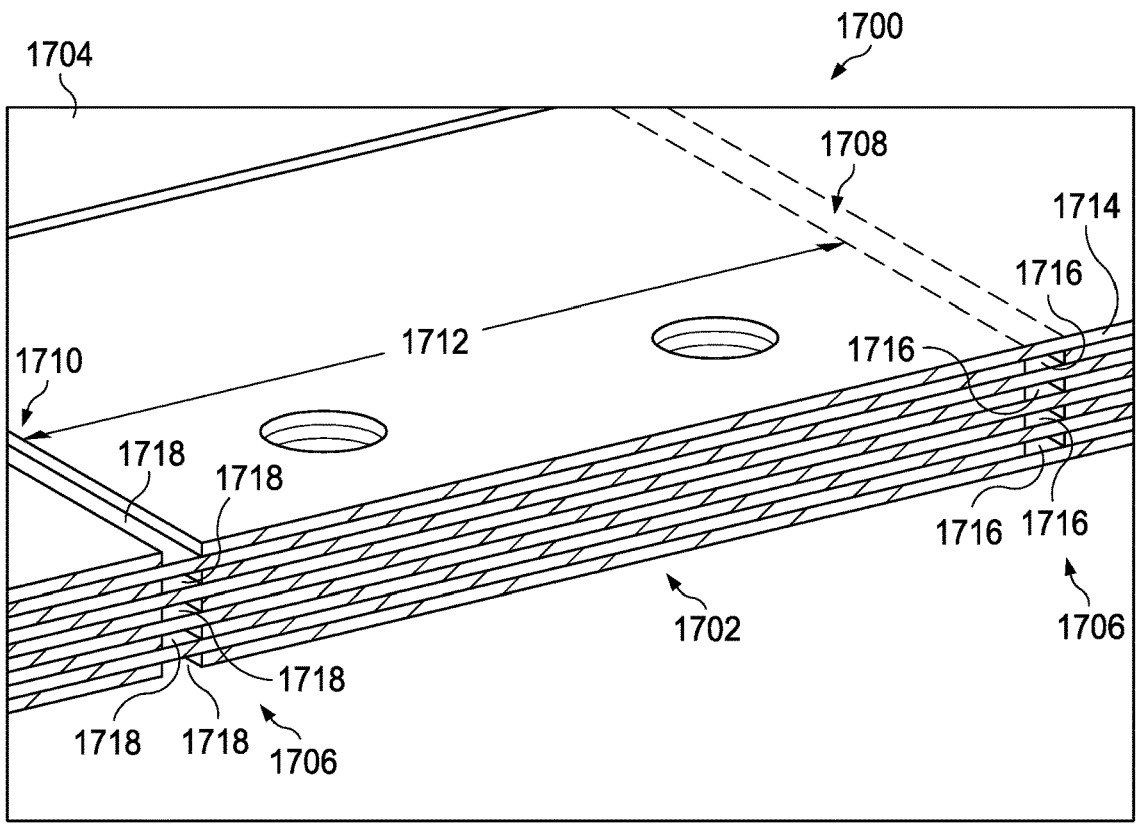
Figure 17B:
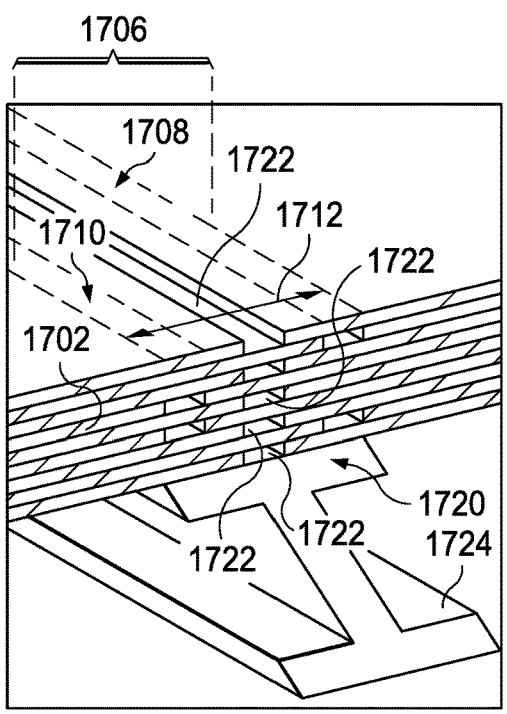
Figure 17C:
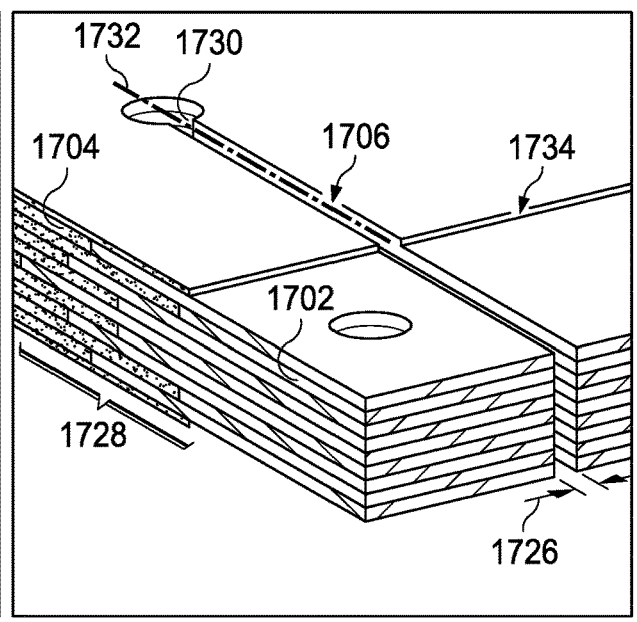

FIG. 17A is a perspective cross-section view of a titanium-composite ply joint, from view 17A in FIG. 16, of a stack of metal sheets, incorporating a Griesson disbond limiter, bonded to a composite laminate depicted in accordance with an illustrative embodiment. In FIG. 17B, FIG. 17A is modified to show an alternative configuration of the Griesson disbond limiter. In FIG. 17C, FIG. 17B is modified to show another alternative configuration of the Griesson disbond limiter.

Figure 18:
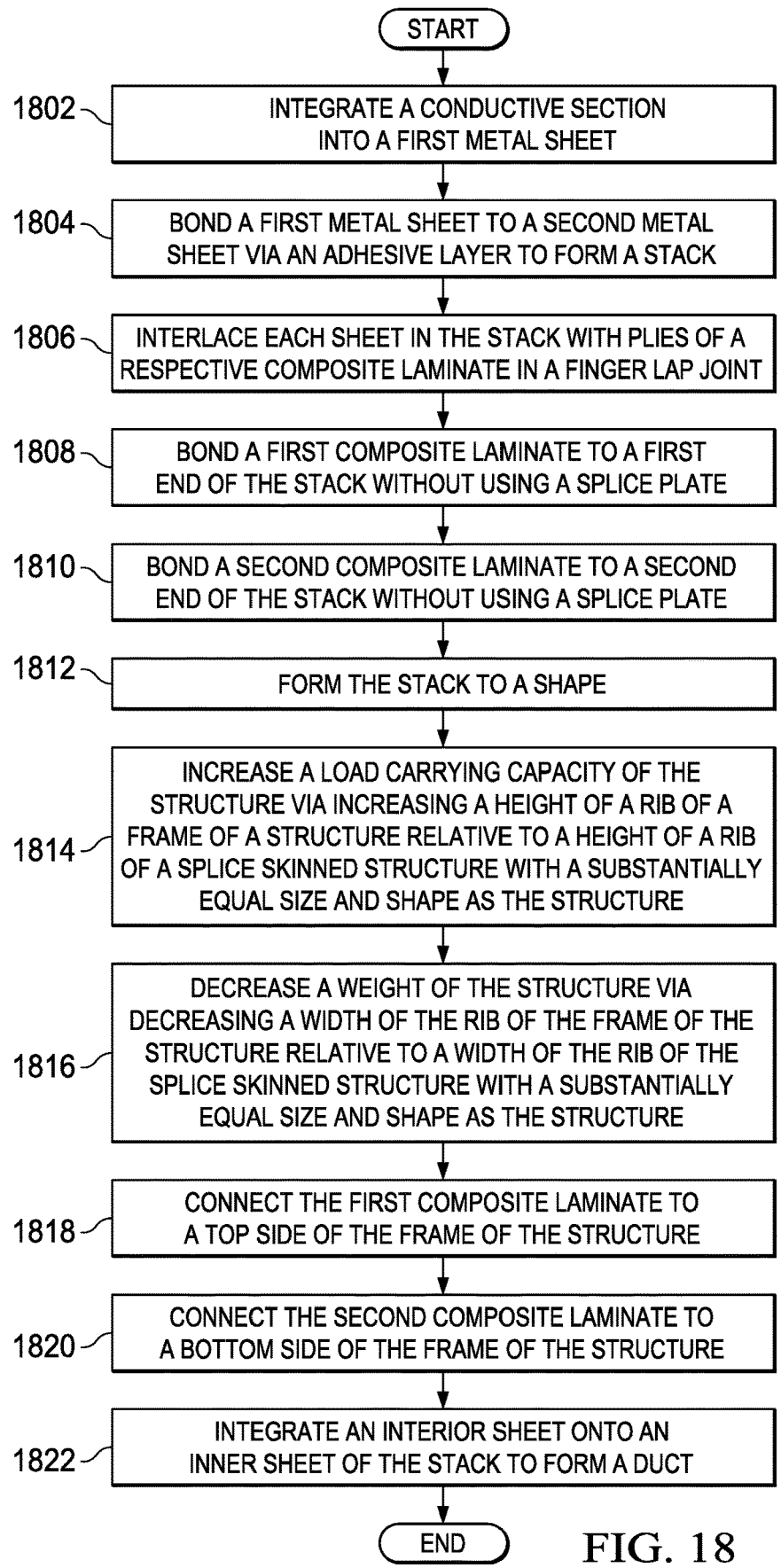

FIG. 18 is a flowchart of a process for bonding a metal skin to a composite skin without using a splice plate in accordance with an illustrative embodiment depicted in accordance with an illustrative embodiment.

Figure 19:
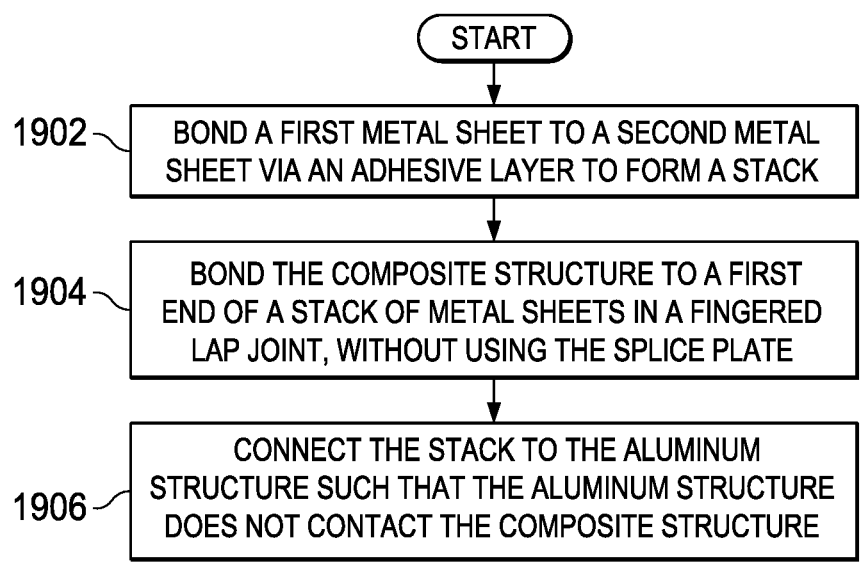

FIG. 19 is a flowchart of a process for inhibiting galvanic corrosion of an aluminum structure connected, without using a splice plate, to a composite structure depicted in accordance with an illustrative embodiment.

DETAILED DESCRIPTION

Figure 1:
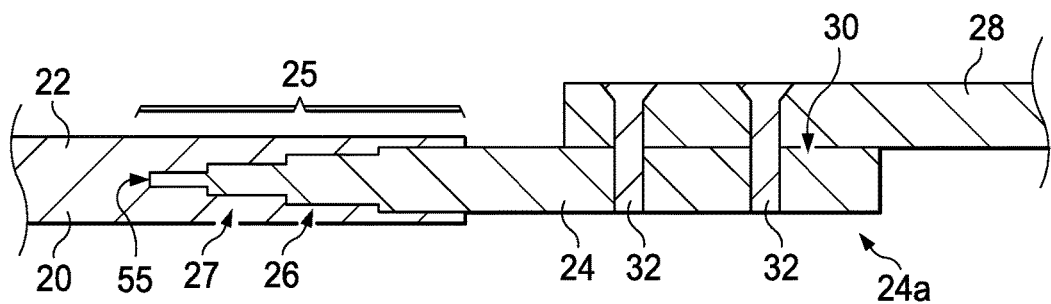
FIG. 1 is an illustration of a sectional view of a composite structure having a composite-to-metal joint.

Referring first to FIG. 1, a hybrid composite structure 20 includes a composite resin portion 22 joined to a metal portion 24 by a transition section 25 that includes a composite-to-metal joint 26. In the illustrated example, the composite structure 20 is a substantially flat composite sheet, however depending upon the application, the structure 20 may have one or more curves, contours or other geometric features. For example, composite structure 20 may comprise an inner and/or outer contoured skin of an aircraft (not shown) which is secured to a frame 28 portion of the aircraft by means of a lap joint 30 and fasteners 32 which pass through the skin 20 into the frame 28.

The frame 28 may comprise a composite, a metal or other rigid material, and the metal portion 24 of the structure may serve as a rigid metal fitting 24 that is suited to transfer a range of loads and types of loadings between the frame 28 and the composite portion 20. As will be discussed below in more detail, the metal portion 24 may comprise any of various metals such as, without limitation, titanium that is substantially non-reactive to and compatible with the composite portion 20 and the frame 28. In one practical embodiment for example, and without limitation, the composite resin portion 22 may comprise a carbon fiber reinforced epoxy, the metal portion 24 may comprise a titanium alloy, and the frame 28 may comprise an aluminum alloy or a composite. The transition section 25 and the joint 26 are strong enough to carry the typical range and types of loads between the composite resin portion 22 and the metal portion 24, including but not limited to tension, bending, torsion and shear loads. Although the illustrated transition section 25 and joint 26 are formed between an all composite resin portion 22 and the all metal portion 24, it may be possible to employ them to join two differing composite structures (not shown) or two differing metal structures (not shown).

Referring to FIGS. 1-4, a layup of composite material plies 35 is terminated at a interface location 39 referred to later herein as a transition point 39, where a metal sheet or ply 37 of the substantially the same thickness as the composite material plies 35 continues to the metal edge 24a of the metal portion 24, and the layup is repeated with a composite-to-metal interface 39 that is staggered toward the metal edge 24a from the prior interface location 39 and includes a ply of structural metal adhesive 45 (see FIGS. 5 and 6) between the metal plies 37, with the next metal-to-composite interface 39 staggered away from the part edge 24a to produce a nested splice 27. This staggered interface stacking, which produces nested tabs 29 (see FIG. 3), is continued to the full thickness of the hybrid composite structure 20 with none of the composite plies 35 extending fully to the metal edge 24a of the all metal portion 24

Figure 2:
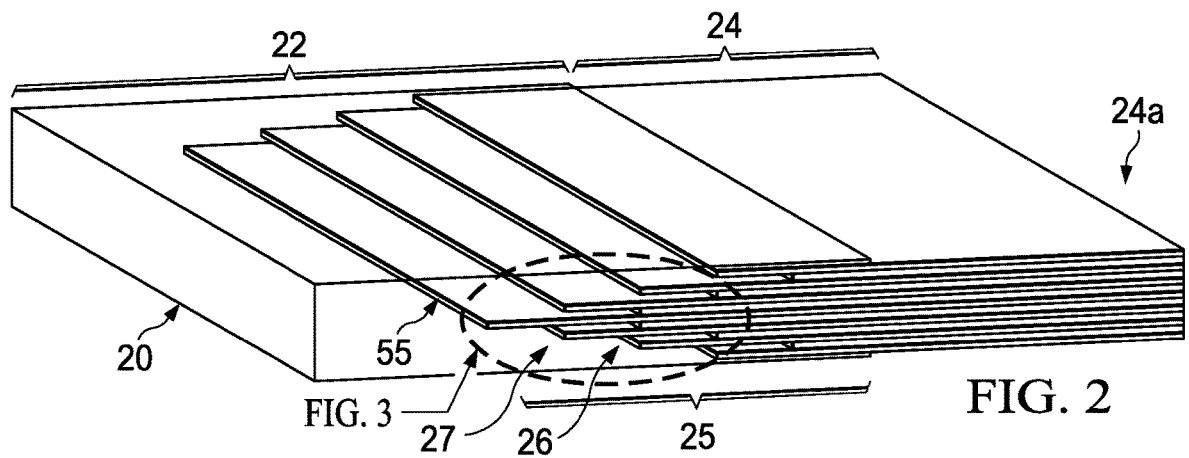
FIG. 2 is an illustration of a perspective view of the composite structure including the composite-to-metal joint.
Figure 3:
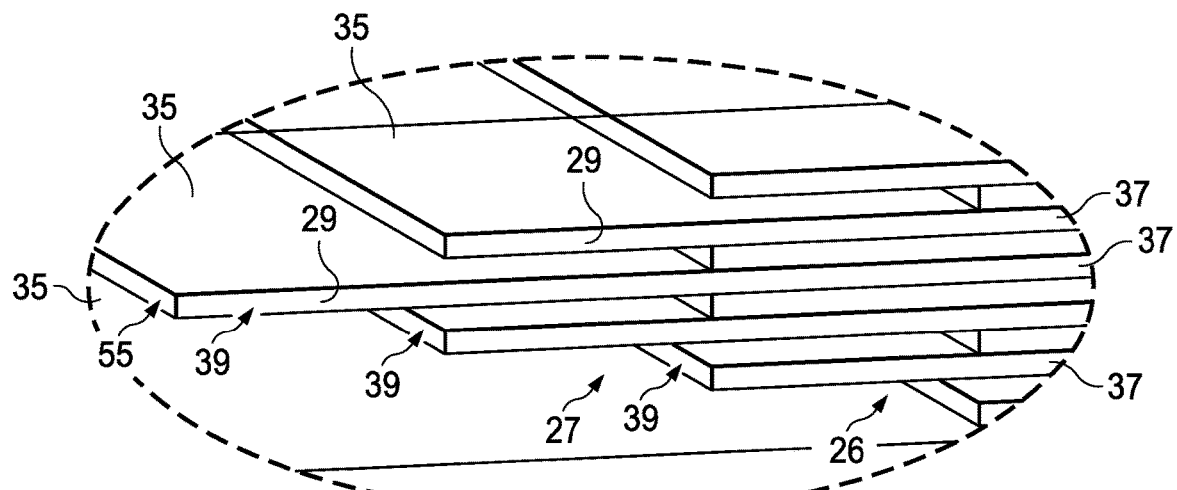
FIG. 3 is an illustration of a perspective view of the area designated as FIG. 3 in FIG. 2.
Figure 4:
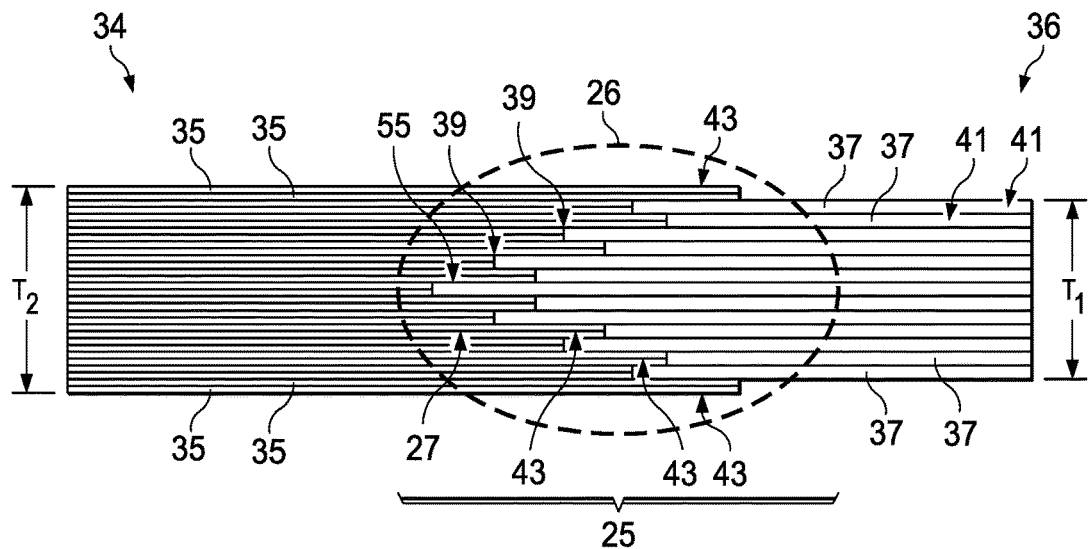
FIG. 4 is an illustration of a cross sectional view of the joint, better showing interleaving between composite plies and the metal sheets.
Figure 5:
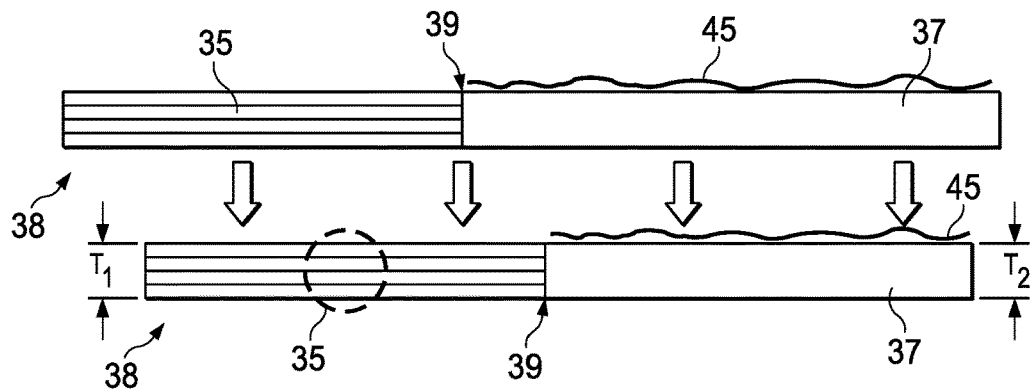
FIG. 5 is an illustration of a cross sectional view of two separated layers of the joint shown in FIG. 4, also showing the application of a film adhesive on the metal sheets.
Figure 6:
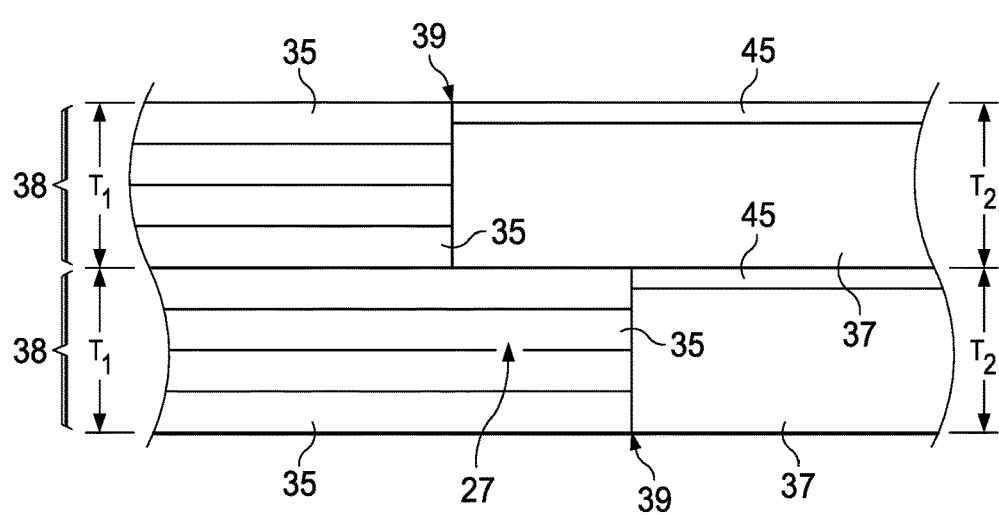
FIG. 6 is an illustration of an enlarged, cross sectional view of a portion of the joint formed by the two layers shown in FIG. 5.

Referring now also to FIGS. 2-4, the composite resin portion 22 of the structure 20 comprises a laminated stack 34 of fiber reinforced resin plies 35, and the metal portion 24 of the structure 20 comprises a stack 36 of metal sheets or plies 37 that are bonded together to form a substantially unitized metal structure. As shown in FIGS. 5 and 6, the composite plies 35 and the metal sheets 37 are arranged in layers 38. Each of the layers 38 comprises one or more of the composite plies 35 in substantially edge-to-edge abutment with one of the metal sheets 37. Thus, each of the layers 38 transitions at a point 39 from a composite i.e. composite resin plies 35, to a metal, i.e. metal sheet 37.

The transition points 39 are staggered relative to each other according to a predetermined lay-up schedule such that the plies 35 and the metal sheets 37 overlap each other in the transition section 25 (FIG. 1). Staggering of the transition points 39 creates multiple bond lines that may reduce the occurrence and/or propagation of cracks or disbonds in the joint 26. The staggering of the transition points 39 also results in a form of interleaving of the composite plies 35 and the metal sheets 37 within the joint 26 which forms a nested splice 27 between the all composite resin portion 22 and the all metal portion 24. This nested splice 27 may also be referred to as a finger bond 26, a finger joint 26 or a multiple step lap joint 26. The adjacent ones of the transition points 39 are spaced from each other in the in-plane direction of the structure 20 so as to achieve a bonded joint 26 that exhibits optimum performance characteristics, including strength and resistance to disbonds and propagation of inconsistencies such as cracks. In the illustrated example, the nested splice 27 forming the joint 26 is a form of a double finger joint 26 in which the transition points 39 are staggered in opposite directions from a generally central point 55 of maximum overlap. However, other joint configurations are possible including but not limited to a single finger joint in which the multiple transition points 39 are staggered in a single direction.

The composite plies 35 may comprise a fiber reinforced resin, such as without limitation, carbon fiber epoxy, which may be in the form of unidirectional prepreg tape or fabric. Other fiber reinforcements are possible, including glass fibers, and the use of non-prepreg materials may be possible. The composite plies 35 may have predetermined fiber orientations and are laid up according to a predefined ply schedule to meet desired performance specifications. As previously mentioned, the bonded sheets 37 may comprise a metal such as titanium that is suitable for the intended application. In the illustrated example, the stack 36 of metal sheets 37 has a total thickness $t_1$ which is generally substantially equal to the thickness $t_2$ of the laminated stack 34 of plies 35. In the illustrated example however, $t_2$ is slightly greater than $t_1$ by a factor of the thickness of several overwrap plies 43 on opposite sides of the stack 34.

FIGS. 5 and 6 illustrate details of two adjoining layers 38 of the joint 26 shown in FIGS. 2-4. In this example, each layer 38 comprises four plies 35 having a collective total thickness $T_1$. The individual metal sheets 37 of the adjacent layers 38 are bonded together by means of a layer of structural adhesive 45, which may comprise a commercial film adhesive or other forms of a suitable adhesive that is placed between the metal sheets 37 during the lay-up process.

The combined thickness of each metal sheet 37 and one layer of adhesive 45 represented as $T_2$ in FIG. 5 is substantially equal to the thickness $T_1$ of the composite plies 35 in the layer 38. Although not shown in the Figures, a thin film of adhesive may be placed between the plies 35 to increase the interlaminar bond strength. In one practical embodiment, titanium alloy metal sheets 37 may be used which each have a thickness of approximately 0.025 inches, the film adhesive 45 may be approximately 0.005 inches thick, and four composite carbon fiber epoxy plies 35 may be used in each layer 38 having a collective total thickness of about 0.030 inches. Depending on the application, the use of metals other than titanium may be possible. The distance between adjacent transition points 39, and thus the length of the overlap between the layers 38, as well as the thickness and number of composite plies 35 and the thickness of the metal sheets 37 will depend on the requirements of the particular application, including the type and magnitude of the loads that are to be transmitted through the joint 26, and possibly other performance specifications.

The differing layers 38 of the joint 26 between the two differing materials of the composite and metal portions 22, 24 respectively (FIG. 1), render the structure 20 well suited to nondestructive evaluations of bond quality using embedded or mounted sensors (not shown). Ultrasonic structural waves (not shown) may be introduced into the structure 20 at the edge of the metal portion 24, at the composite portion 22 or in the transition section 25. These ultrasonic waves travel through what amounts to a waveguide formed by the metal 37 sheets and the interfaces (not shown) between the composite plies 35 and the metal sheets 37. MEMS-based (microelectromechanical) sensors, thin piezo-electric sensors (not shown) or other transducers placed in the structure 20 may be used to receive the ultrasonic structural waves for purposes on analyzing the condition of the bondlines in the joint 26.

Figure 7:
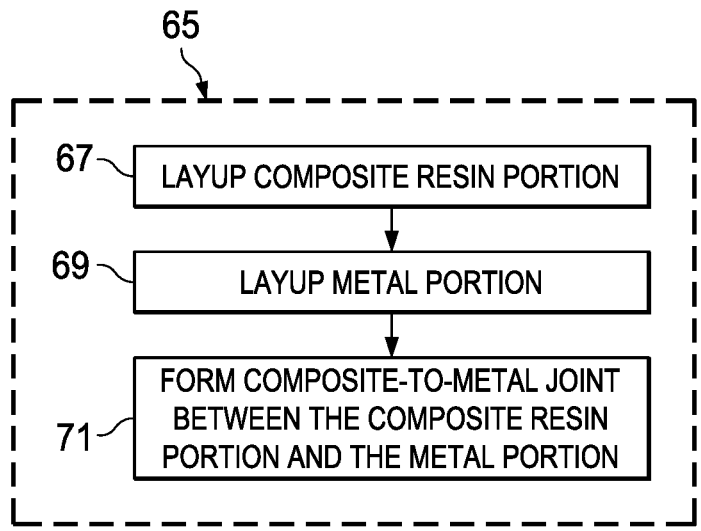
FIG. 7 is an illustration of a broad flow diagram of a method of making a composite structure having the composite joint shown in FIGS. 2-4.

Referring now to FIG. 7, one method of making the composite structure 20 comprises forming a multi-layer composite lay-up as shown at 65. Forming the lay-up includes laying up a composite resin portion 22 at step 67, and laying up a metal portion 24 at 69. The step 65 of forming the layup further includes forming a composite-to-metal joint between the composite resin portion and the metal portion of the lay-up, shown at 71.

Figure 8:
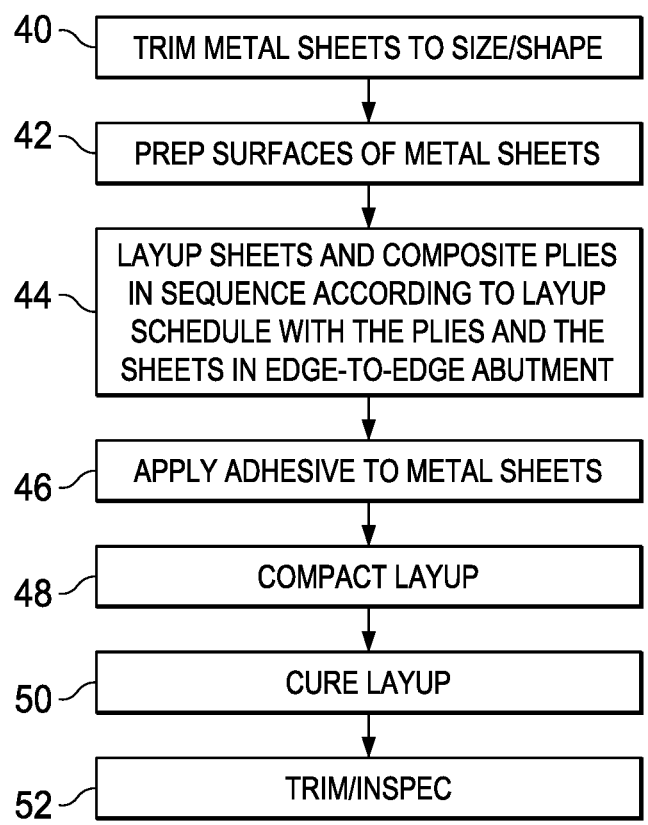
FIG. 8 is an illustration of a flow diagram showing additional details of the method shown in FIG. 7.

FIG. 8 illustrates additional details of the method shown in FIG. 7. Beginning at step 40, individual metal sheets 37 are trimmed to a desired size and/or shape. Next at 42, the surfaces of the metal sheets 37 are prepared by suitable processes that may include cleaning the metal sheets 37 with a solvent, drying them, etc. then at 44, the lay-up is assembled by laying up the metal sheets 37 and the composite plies 35 in a sequence that is determined by a predefined ply schedule (not shown) which includes a predetermined staggering of the transition points 39 between the plies 35 and the metal sheet 37 in each layer 38.

During the lay-up process, the metal sheets 37 are sequenced like plies into the lay-up, much like composite plies are sequenced into a lay-up in a conventional lay-up process. As shown at step 46, adhesive may be introduced between the metal sheets 37 in order to bond them together into a unitized metal structure. Similarly, although not shown in FIG. 8, a bonding adhesive may be introduced between the individual composite plies 35 in order to increase the bond strength between these plies 35. Next, at 48, the lay-up may be compacted using any of several known compaction techniques, such as vacuum bagging following which the lay-up is cured at step 50 using autoclave or out-of-autoclave curing processes. At step 52, the cured composite structure 20 may be trimmed and/or inspected, as necessary.

Figure 9:
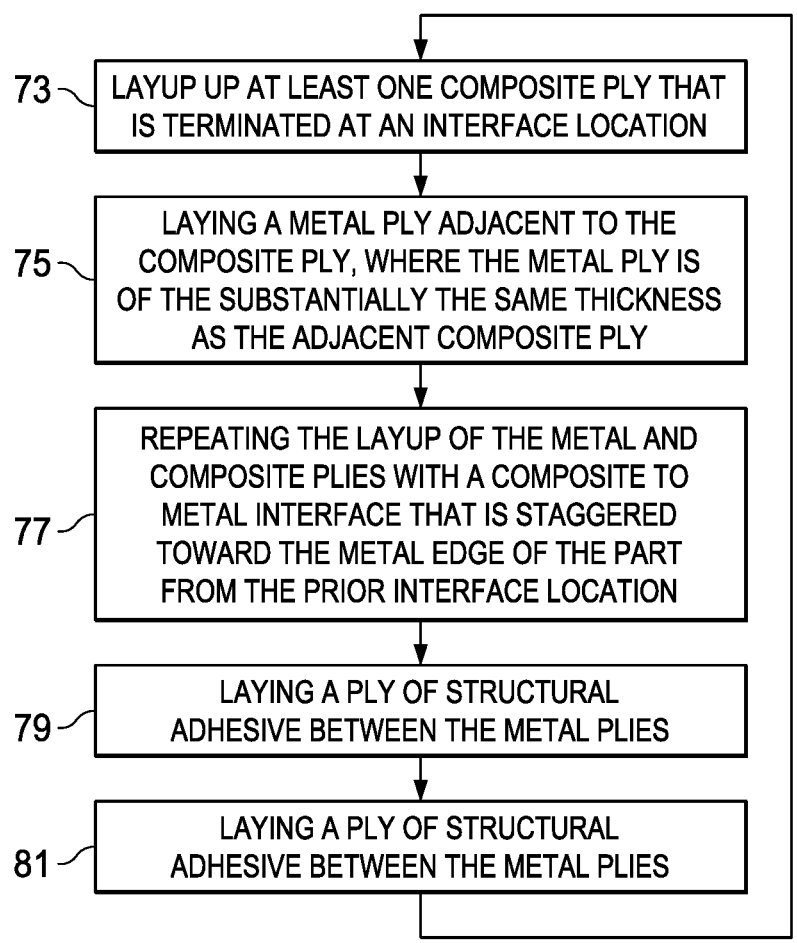
FIG. 9 is a flow diagram of another method of making a composite structure having the composite joint shown in FIGS. 2-4.

FIG. 9 illustrates still another embodiment of a method of making a hybrid composite part 20. The method begins at step 73 with laying at least one composite ply 35 that is terminated at an interface location 39 on a suitable layup tool (not shown). At 75, an adjacent metal ply 37 is laid up which is substantially the same thickness as the adjacent composite ply 35. As shown at 77, the layup process is repeated with a composite-to-metal interface 39 that is staggered toward the metal edge 24a of the part 20 from the prior interface location 39. At 79, a ply of structural adhesive 45 is laid between the metal plies 37. Steps 73-79 are repeated successively to produce a nested splice 27 and a staggered interface stacking forming nested tabs 29 to the full thickness of the hybrid part 20, with none composite plies 35 extending fully to the metal edge 24a of the part 20. Although not shown in FIG. 9, the completed layup is vacuum bagged processed to remove voids, and is subsequently cured using any suitable curing method.

Figure 10:
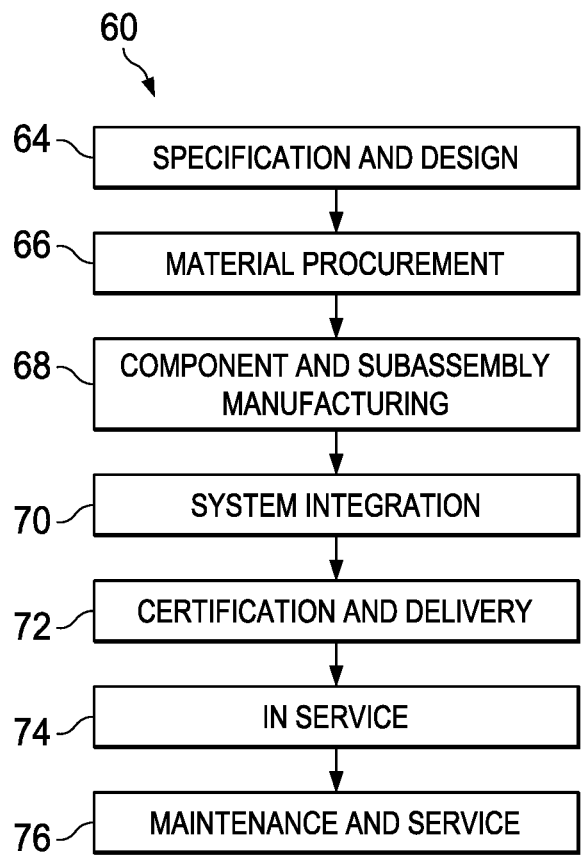
FIG. 10 is an illustration of a flow diagram of aircraft production and service methodology.
Figure 11:
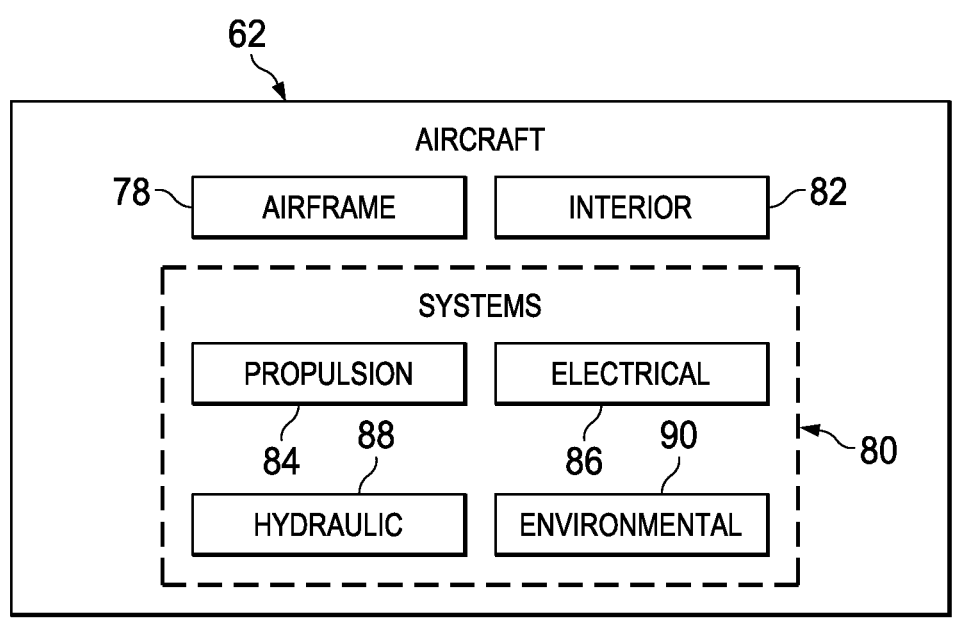
FIG. 11 is an illustration of a block diagram of an aircraft.

Embodiments of the disclosure may find use in a variety of potential applications, particularly in the transportation industry, including for example, aerospace, marine and automotive applications. Thus, referring now to FIGS. 10 and 11, embodiments of the disclosure may be used in the context of an aircraft manufacturing and service method 60 as shown in FIG. 10 and an aircraft 62 as shown in FIG. 11. Aircraft applications of the disclosed embodiments may include, for example, a wide variety of structural composite parts and components, especially those requiring the use of fasteners during the assembly process. During pre-production, exemplary method 60 may include specification and design 64 of the aircraft 62 and material procurement 66. During production, component and subassembly manufacturing 68 and system integration 70 of the aircraft 62 takes place. Thereafter, the aircraft 62 may go through certification and delivery 72 in order to be placed in service 74. While in service by a customer, the aircraft 62 is scheduled for routine maintenance and service 76 (which may also include modification, reconfiguration, refurbishment, and so on).

Each of the processes of method 60 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 62 produced by exemplary method 60 may include an airframe 78 with a plurality of systems 80 and an interior 82. Examples of high-level systems 82 include one or more of a propulsion system 84, an electrical system 86, a hydraulic system 88, and an environmental system 90. Any number of other systems may be included. The disclosed method may be employed to fabricate parts, structures and components used in the airframe 78 or in the interior 82. Although an aerospace example is shown, the principles of the disclosure may be applied to other industries, such as the marine and automotive industries.

Systems and methods embodied herein may be employed during any one or more of the stages of the production and service method 60. For example, parts, structures and components corresponding to production process 68 may be fabricated or manufactured in a manner similar to parts, structures and components produced while the aircraft 62 is in service. Also, one or more apparatus embodiments, method embodiments, or a combination thereof may be utilized during the production stages 68 and 70, for example, by substantially expediting assembly of or reducing the cost of an aircraft 62. Similarly, one or more of apparatus embodiments, method embodiments, or a combination thereof may be utilized while the aircraft 62 is in service, for example and without limitation, to maintenance and service 76.

Thus, described above may be illustrative embodiments for a composite structure. The embodiments may include a laminated stack of fiber reinforced resin plies; and a stack of metal sheets that may include edges interleaved with edges of the fiber reinforced resin plies and may form a composite-to-metal joint connecting the fiber reinforced resin plies with the metal sheets.

The embodiments of the composite structure may further include the stacks of fiber reinforced resin plies and metal sheets being arranged in layers, wherein each of the layers may include a metal sheet and at least one of the fiber reinforced resin plies. The thickness of the fiber reinforced resin plies in each of the layers may be generally equal to the thickness of the metal sheet in the layer.

Additionally, the composite structure may include the fiber reinforced resin plies and the metal sheet in each of the layers being configured with substantially abutting edges forming a resin-to-metal transition point. The transition points of the layers may be staggered relative to each other.

Further, the embodiment of the composite structure may be configured such that the layers form a fiber reinforced resin-to-composite finger joint between the stack of resin plies and the stack of metal sheets. A layer of adhesive may be between adjacent ones of the metal sheet for bonding the sheets together. The metal sheets may be a titanium alloy. The fiber reinforcement of the plies may include carbon.

Illustrative embodiments above may also show a hybrid composite resin-metal structure, which may include a composite resin portion including laminated plies of fiber reinforced resin; a metal portion including bonded sheets of metal; and a transition section between the composite resin portion and the metal portion, the transition section including staggered overlaps between the laminated plies and the metal sheets. The illustrative embodiments may include the hybrid composite resin-metal structure such that the laminated plies and the metal sheets may be arranged in layers, and each of the layers may include one of the metal sheets and a plurality of the fiber reinforced resin plies in substantially edge-to-edge abutment.

Illustrative embodiments of the hybrid composite resin-metal structure above may also include the thickness of the plies in each of the layers being substantially equal to the thickness of the metal sheet in the layer. The staggered overlaps may form a composite-to-metal finger joint between the composite resin portion and the metal portion. The hybrid composite resin-metal structure may also include a layer of adhesive between each of the metal sheets configured to bond the sheets together and unitizing the metal portion. Each of the metal sheets may be a titanium alloy.

Illustrative embodiments above also presented a hybrid composite metal part, that may include a layup of fiber reinforced composite material that may be terminated at an interface location, where a metal ply of the same thickness as the composite material may continue to the metal edge of the part, and the layup may be repeated with a composite to metal interface that may be staggered toward the edge of the part from the prior interface location and may include a ply of structural adhesive between the metal plies. The next metal to composite interface may be staggered away from the part edge and may produce a nested splice. The staggered interface stacking may produce nested tabs and may continue to the full thickness of the part with none of the composite plies extending fully to the edge of the part.

Illustrative embodiments above also presented a method of fabricating a composite structure, the method may include: forming a multi-layer composite lay-up having a fiber reinforced composite resin portion and a metal portion, including forming a composite-to-metal joint between the composite resin portion and the metal portion of the lay-up. Forming the lay-up may include forming each of the layers by placing at least one fiber reinforced composite resin ply and one metal sheet in substantially edge-to-edge abutment with each other to form a transition point between the fiber reinforced composite resin and the metal in the layer.

Illustrative embodiments of the method may also include forming the lay-up to include staggering the transition points in the layers relative to each other. Unitizing the metal portion may include placing a layer of adhesive between the metal sheets.

Illustrative embodiments above also presented a method to produce a hybrid metal part that may include laying at least one fiber reinforced composite ply that may be terminated at a interface location; laying an adjacent metal ply where the metal ply may be of the same thickness as the adjacent fiber reinforced composite ply; repeating the steps of laying composite plies and adjacent metal plies to form a composite to metal interface that is staggered toward said an edge of the part from the prior interface location; laying a ply of structural adhesive between the metal plies; and repeating the composite and metal ply layup where the next metal to composite interface may be staggered away from the part edge to produce a nested splice. The method may also include continuing the staggered interface stacking of the composite and metal plies to produces nested tabs to the full thickness of the part with none of composite plies extending fully to the edge of the part. The method may further include vacuum bag processing the part to remove air voids in the layup; and curing the laid up part.

Illustrative embodiments above also presented a hybrid composite resin-metal aircraft structure that may include: a plurality of laminated layers forming a fiber reinforced, all composite portion, an all metal portion and a hybrid composite-metal finger joint connecting the composite portion with the metal portion. Each of the layers may include a plurality of plies of composite resin and a titanium metal sheet, wherein the plies and the metal sheet may be arranged in edge-to-edge abutment with each other forming a composite-to-metal transition point in the layer, and wherein the transition points in the layers may be staggered relative to each other to form the finger joint.

Illustrative embodiments of the hybrid composite resin-metal aircraft structure above may also include a layer of adhesive between the metal sheets for unitizing the metal sheets. The thickness of the plies in each of the layers may be substantially equal to a combined thickness of one of the sheets and layer of the adhesive.

Illustrative embodiments above also presented a method of making a hybrid composite resin-metal aircraft structure.

The method of the illustrative embodiments may include: forming a lay-up including a fiber reinforced, all composite portion, an all metal portion and a hybrid composite-metal finger joint connecting the composite portion with the metal portion. Forming the layup including laying up a plurality of layers wherein each of the layers may be formed by placing a plurality of composite resin plies in edge-to-edge abutment with a titanium metal sheet forming a composite-to-metal transition point in the layer; placing a layer of adhesive between the metal sheets to unitize the metal portion; forming the joint between the composite portion and the metal portion by staggering the transition points in the layers relative to each other; compacting the layup; and curing the layup.

The illustrative embodiments recognize and take into account that an ability to remove and replace damaged components may increase a functionality and/or a value of a product containing components. While metallic designs may favor bolting to join components to a structure, idealized composite designs may tend to favor bonding. The illustrative embodiments recognize and take into account that an ability to leverage the advantages of metallic bolted joint characteristics, while gaining the performance advantages of composites in a single joint and/or within a single component may provide advantages of improved strength and/or reduced thickness, and/or reduced weight over joints and/or components containing only metal, only composites, or padding up a gauge of the component and/or joint.

The illustrative embodiments recognize and take into account that a section within a component or a joint between components in a structure that bonding titanium sheets to composite plies in a Ti-Ply material may enables a structure to have the weight and fatigue characteristics of a composite, along with the ability to fasten and/or join similar to components that are fully metallic.

The illustrative embodiments recognize and take into account that traditional composite to metallic joints fail in the joint once the metallic portion of the joint starts to yield. Tensile tests have shown that a joint using Ti-Ply materials and/or methods may survive not only the critical metallic yield point, but that ultimate failure of the components being joined may occur outside the joint completely, in the fully metal portion connected to the joint. The eventual metal failure may result from a classic neck down behavior and failure, after transitioning through both the elastic and plastic zones for the fully metal portion connected to the joint. Thus, multiple metallic sheets bonded to composite plies in a Ti-Ply joint may create multiple load paths, which contribute overall durability of the Ti-Ply joint and its superior performance in strength and/or resilience as compared to a joint or a component section that may be fully composite or fully metallic.

The illustrative embodiments further recognize and take into account that resistance of a metal skin on a structure to dents or failure caused by impact forces from an object impacting the skin may be stronger than resistance of a composite skin on the same structure receiving the same impact force. Thus, while composite skin may be desirable on a structure such as an aircraft wing leading edge or door frame to reduce weight and corrosion risk of the skin, when impact resistance is significant, it may be more desirable to use a metal component at these locations. Thus, for reasons noted above, and others, it may be desirable to replace a composite skin with a metal skin at certain locations on a structure.

The illustrative embodiments recognize and take into account that graphite may act as a cathode while aluminum may act as an anode that may facilitate galvanic corrosion of aluminum connected to graphite, particularly in the presence of an electrolyte solution. Accordingly, a composite material containing a fiber including graphite has been observed to induce galvanic corrosion in a structure including aluminum as a component in contact with the graphite. Composites reinforced with carbon fibers may contain graphite. Accordingly, connecting a component that may contain a carbon fiber element directly to a component that may contain aluminum may be an undesired design.

With reference now to FIG. 12A through FIG. 12D, they are illustrative embodiments depicting a cross-sectional side view of a structure formed by a frame and a skin. FIG. 12A is an illustrative embodiment depicting a cross-sectional side view of a structure formed by a frame and a composite skin. FIG. 12B is an illustrative embodiment depicting a cross-sectional side view of a structure including a frame, a composite skin, a metal skin, and a splice plate connecting the metal skin to the composite skin. FIG. 12C is an illustrative embodiment depicting a cross-sectional side view of a structure including composite skin connected to a metal skin. FIG. 12D is an illustrative embodiment depicting a zoomed in view of a connection of the metal skin to the composite skin on the structure depicted in FIG. 12C.

With reference now to FIG. 12A, Structure 1202 is shown with frame 1204. Without limitation, frame 1204 may be a section of a skeletal support for structure 1202. Without limitation, when structure 1202 may be a wing, skeletal structure may be a wing box, and frame 1204 may be a rib of the wing. A covering may be placed on frame 1204. The covering on frame 1204 may be composite skin 1206. Composite skin 1206 may include: a continuous sheet, separate sheets, or may be cocured or bonded sheets that may cover entirety of frame 1204. Cocured sheets may be sheets that are joined into a single structure during curing. Thus, composite skin 1206 may cover frame 1204 as a monolithic shell. Composite skin 1206 may be connected to frame 1204. Composite skin 1206 may be bonded to frame 1204.

Structure 1202 may be referred to as a composite skinned structure. Frame 1204 may have a web 1238. Web 1238 may have a height 1240.

Structure 1202 may be a wing. A wing may be a part on an aircraft. Without limitation, the wing may be for an aircraft. Without limitation, frame 1204 may be a part of a wing box for a wing. When structure 1202 is a wing, composite skin 1206 around a leading edge of the wing may be impacted by an object. The object may be without limitation: an object from the ground or an airborne object. Without limitation the object from the ground may be a rock, a piece of a suitcase, or a vehicle. Without limitation the airborne object may be a bird, or a hail stone.

A composite skin 1206 may, if impacted, suffer a damage that requires repair. It may be desirable to have a skin on a structure be able to endure an impact force without requiring repair to the skin, such as without limitation 500 inch pounds from hail. It may be desirable to have a skin on a structure be able to endure an impact force without requiring repair to the skin such as without limitation 1200 inch pounds from a dropped tool on the skin.

Impact forces from a particular object may be larger if the particular object impacts the wing while the wing is in flight than if the wing not in flight. Thus, impact to composite skin 1206 may damage the composite skin 1206. Damage to composite skin may be without limitation: an indentation, a debond or a crack in or within the composite skin, or a failure or shattering of the composite skin. Thus, to reinforce against potential damage from impact to composite skin 1206 on frame 1204 of structure 1202, it may be desirable to cover part of frame 1204 with a material that may have a greater resistance to impact damage than the resistance to damage of composite skin 1206. In an illustrative embodiment, it may be desirable to use metal to cover frame 1204, or as a part of the skin covering, for a leading edge of a wing.

In general, for any particular material, a thicker skin may provide greater resiliency to absorb an impact without a structural failure and/or a need for repair than a thinner skin of the particular material. However, for any particular material increasing thickness of the skin will increase its weight.

In aircraft applications, reducing a weight of any component will benefit fuel efficiency for the aircraft. Further, reduction in an overall size of a wing may reduce a profile drag component of the wing. Thus, a thinner skin may be desired over a thicker skin to improve aircraft performance and efficiency. For a given thickness, some materials may provide better impact resistance than other materials.

In general, for a skin of a given thickness, a skin made with aluminum may provide better impact resiliency than a composite skin. Without limitation, a fracture toughness value for aluminum may have a fracture toughness value that is approximately 8 times the fracture toughness value of a fiber reinforced composite. Thus, for an equivalent strength that takes into account a relatively equal Young's modulus, a skin made with aluminum as compared to a skin made with a fiber reinforced composite, the skin made with aluminum may be 7 times tougher than the skin made with the fiber reinforce composite. Thus, for a location of a structure that may be prone to receiving an impact, a skin of aluminum may be favored over a skin of composite. However, as noted above, due to galvanic corrosion of aluminum in contact with some composite fibers, aluminum skin may not be a desired component on a structure with skin of fiber reinforced composites.

For a skin of a given thickness, a skin made with titanium may provide better impact resiliency than a skin including aluminum. Without limitation a titanium alloy may have a Young's modulus that may be approximately 1.6 times greater than a Young's modulus for aluminum or a composite. Without limitation a titanium alloy may have a fracture toughness that may be approximately twice a fracture toughness of aluminum or 20 times the fracture toughness of a skin made of a composite. Thus, for an equivalent strength that takes into account Young's modulus, the skin made with titanium may be 1.4 times tougher than the skin made with aluminum or 10 times tougher than the skin made with composites.

With reference now to FIG. 12B, FIG. 12B is an illustrative embodiment depicting a cross-sectional side view of a structure including a frame, a composite skin, a metal skin, and a splice plate connecting the metal skin to the composite skin. Structure 1242 may include frame 1244. Similar to frame 1204 above, without limitation, frame 1244 may be a section of a skeletal support for structure 1242. Without limitation, when structure 1242 may be a wing, skeletal structure may be a wing box, and frame 1244 may be a rib of the wing. Frame 1244 may be covered by first composite laminate 1208, second composite laminate 1210, and metal skin 1212.

First end 1214 of metal skin 1212 may be connected to end 1218 of first composite laminate 1208, without any direct connection, via first splice plate 1216. A distance separating first end 1214 and end 1218 may not be shown to scale in FIG. 12B.

Second end 1220 of metal skin 1212 may be connected to end 1224 of second composite laminate 1210, without any direct connection, via second splice plate 1222. A distance separating second end 1220 and end 1224 may not be shown to scale in FIG. 12B. Although FIG. 12B shows metal skin 1212 as being a stack of metal sheets, metal skin 1212 may be a single sheet of metal, such as without limitation a single sheet of aluminum alloy.

Structure 1242 may be referred to as a spliced skin structure. Structure 1242 may have a perimeter that is substantially equal in size and shape to a perimeter of structure 1202, such that if structure 1202 and structure 1242 were aircraft wings, they may be considered as having the same NACA airfoil designation.

First composite laminate 1208 and/or second composite laminate 1210 may include a carbon fiber. The carbon fiber in first composite laminate 1208 and/or second composite laminate 1210 may include a material that may cause galvanic corrosion of metal skin 1212. Without limitation, the material may be graphite. When metal skin 1212 is a metal that may act like an anode when in contact with a carbon fiber or graphite, such as without limitation aluminum or aluminum alloys, then to inhibit galvanic corrosion of metal skin 1212, the graphite may be separated from contacting metal skin 1212. Currently, separation of metal skin 1212 from a composite component is commonly provided by using splice plates such as splice plate 1216 and splice plate 1222. Splice plates are commonly made from materials that may not operate as an anode to a carbon fiber or graphite, such as without limitation titanium or titanium alloys. Thus without limitation, in FIG. 12B, splice plate 1216 and splice plate 1222 may be made including titanium or a titanium alloy.

Commonly, the space occupied by a splice plate may require an adjacent jog inward of a perimeter of a frame of a structure. Without limitation, as shown in the illustrative embodiment of FIG. 12B, top side 1226 of frame 1244 requires jog 1264 to accommodate splice plate 1216 without requiring a fairing and/or an extrusion of a profile of structure 1242 above splice plate 1216. Similarly, bottom side 1228 of frame 1244 may require jog 1266 to accommodate splice plate 1222 without requiring a fairing and/or an extrusion of a profile of structure 1242 below splice place 1222. Without limitation, when frame 1244 may be a rib of a wing, top side 1226 may be a flange along a top side of the rib, and bottom side 1228 may be a flange along a bottom side of the rib.

As a result, height 1248 of web 1246 of frame 1244 may not be as great as height 1240 of web 1238 of frame 1204 or as great as height 1256 of web 1254 of frame 1252. Accordingly, to carry the same load, web 1254 may be thinner than web 1246. Thus, web 1254 may have less weight than web 1246. Web 1254 being less weight than web 1246 may contribute to greater performance and/or fuel efficiency for an aircraft containing frame 1252 as compared to the aircraft containing frame 1244.

First composite laminate 1208 may be joined to second composite laminate 1210 to form a single structure, at a left side of the structure not shown in FIG. 12B, or may remain as two distinct laminate sheets. First composite laminate 1208 may be connected to top side 1226 of frame 1244. Second composite laminate 1210 may be connected to bottom side 1228 of frame 1244. Without limitation, when frame 1244 may be a rib of a wing, top side 1226 may be a flange along a top side of the rib, and bottom side 1228 may be a flange along a bottom side of the rib.

Each splice plate may require additional hardware, such as without limitation fasteners 1230, to connect each splice plate to metal skin 1212, to frame 1244, and/or to composite laminates. Splice plates and fastening hardware associated with the splice plates may add additional weight, manufacturing time and manpower, and cost to constructing a structure with metal skin 1212 and a composite laminate sheet, as compared to constructing a structure with a skin without splice plates.

Structure 1242 may have web 1246 with height 1248. Frame 1244 may be similar to frame 1204, except that frame 1244 may need to be altered to accommodate splice plate 1216 and/or splice plate 1222. Therefore, when a perimeter of structure 1242 may be substantially equal to the perimeter of structure 1202, the use of splice plate 1216 and/or splice plate 1222 may require height 1248 to be less than height 1240. Accordingly, web 1246 may need to be thicker than web 1238.

With reference now to FIG. 12C, FIG. 12C is an illustrative embodiment depicting a cross-sectional side view of a structure including composite skin connected to a metal skin. FIG. 12C depicts structure 1250 having frame 1252 covered by first composite laminate 1208, second composite laminate 1210, and metal skin 1212. Similar to frame 1204 above, without limitation, frame 1252 may be a section of a skeletal support for structure 1250. Without limitation, when structure 1250 may be a wing, skeletal structure may be a wing box, and frame 1252 may be a rib of the wing. First composite laminate 1208 may be considered a first section of a skin on frame 1252. Second composite laminate 1210 may be considered a second section of a skin on frame 1252.

Metal skin 1212 may connect to first composite laminate 1208 and to second composite laminate 1210 via respective bonded finger joints as shown in greater detail in FIG. 12D. Without limitation, metal skin 1212 may be curved as shown in FIG. 12C. Without limitation, metal skin 1212 may form a leading edge of a structure, such as without limitation a wing for an aircraft. Alternatively, metal skin 1212 may be some other shape, such as without limitation angled or straight.

A first end 1268 of metal skin 1212 may connect directly to first composite laminate 1208 without using any splice plate 1216. A second end 1270 of metal skin 1212 may connect directly to second composite laminate 1210 without any splice plate 1222. Thus, metal skin 1212 may connect directly to composite laminates and form a monolithic shell around frame 1252.

Metal skin 1212 may be made from a metal that does not act as an anode for a material in the composite laminates. Thus, without limitation when metal skin 1212 may include titanium or a titanium alloy, metal skin 1212 may connect directly to first composite laminate 1208 and to second composite laminate 1210 without supporting galvanic corrosion of metal skin 1212.

Metal skin 1212 may be bonded to first composite laminate 1208 and/or second composite laminate 1210 via an adhesive. Thereby, a wing may be formed with a leading edge including titanium or a titanium alloy that can directly connect to a composite skin on a top side and/or a composite skin on a bottom side of the wing without using a splice plate to connect the leading edge to the respective composite skins. Thus, FIG. 12C shows metal skin 1212 may be connected to first composite laminate 1208 and/or second composite laminate 1210 without the using any splice plates, and without any fasteners 1230 connecting metal skin 1212 to first composite laminate 1208 and/or second composite laminate 1210.

Metal skin 1212 may include inner sheet 1258, middle sheet 1260, and outer sheet 1262. Each metal sheet may be bonded to each adjacent metal sheet. Sheets may be bonded by a layer of adhesive. Thus, there may be a first adhesive layer between inner sheet 1258 and middle sheet 1260, and a second adhesive layer between middle sheet 1260 and outer sheet 1262. In some illustrative embodiments, less, or more than (as shown for FIG. 12D below) three metal sheets may be used.

Structure 1250 may be referred to as a Ti-ply skinned structure. Structure 1250 may have a perimeter that is substantially equal in size and shape to the perimeter of structure 1202 and/or the perimeter of structure 1242, such that if structure 1250, structure 1202, and structure 1242 were aircraft wings, they may each be considered as having the same NACA airfoil designation.

Frame 1252 may have a web 1254. Web 1254 may have a height 1256. Because the Ti-ply structure shown in FIG. 12C may not need any splice plates, height 1256 may be greater than height 1248. Thus, web 1254 may offer greater strength and load carrying capacity to structure 1250 as compared to structure 1242 by virtue of the greater height 1256 of web 1254 as compared to web 1246.

Alternatively, if greater strength or load carrying capacity were not needed from web 1254 as compared to web 1246, then the added height of web 1254, as compared to web 1246, may allow web 1254 to be thinner than web 1246. Thus, frame 1252 may be lighter than frame 1244 and reduce a weight of structure 1250 as compared to structure 1244. When structures 1242 and 1250 are wings, the reduced weight of web 1254, as compared to web 1246, may provide a greater fuel efficiency for structure 1250 as compared to structure 1242. Thus, a Ti-ply skinned wing, as shown without limitation by FIG. 12C, may provide reduced weight and increased fuel efficiency, or greater strength and load carrying capacity, than a splice skinned wing, as shown without limitation by FIG. 12B.

Further, in compression after impact testing performed on bonded titanium sheets abutting composite laminate plies and interleaved in a finger joint, as illustrated without limitation in FIG. 12C and in greater detail in FIG. 12D, a composite laminate side and a metal stack side of the bond tolerated 1200 inch-pounds of impact without causing any debond or material failure in the joint or adjoining components. Thus, bonded titanium sheets abutting composite laminate plies and interleaved in a finger joint, as illustrated without limitation in FIG. 12C and in greater detail in FIG. 12D, provide high operational resilience that may provide an impact tolerant edge for a structure that may be stronger and more resilient than a structure with a substantially equal shape and size that is fully constructed with a composite skin, such as without limitation structure 1202 depicted by FIG. 12A.

Also, bonded titanium sheets abutting composite laminate plies and interleaved in a finger joint, as illustrated without limitation in FIG. 12C and in greater detail in FIG. 12D, may provide high operational resilience that may provide an impact tolerant edge for a structure that may be thinner and/or lighter than a structure with a substantially equal shape and size that may be constructed using a splice plate to separate metal and composite skin components to avoid galvanic corrosion to the metal components, such as without limitation structure 1242 depicted by FIG. 12B. Hence, using bonded titanium sheets abutting composite laminate plies and interleaved in a finger joint, as illustrated without limitation in FIG. 12C and in greater detail in FIG. 12D, may allow construction of a wing that may provide a wing with a leading edge that is more resilient than an alternative wing leading edge such as without limitation a wing with a composite leading edge (such as without limitation FIG. 12A), and/or lighter and/or stronger than a wing with a splice plate construction isolating metal from composite components (such as without limitation FIG. 12B).

Further, the constructing a structure, such as without limitation structure 1250 with a monolithic shell comprising metal skin 1212 connected to first composite laminate 1208 and second composite laminate 1210 may not only eliminate a need for a use of any splice plates, any fasteners for the splice plates, and/or any other hardware associated with connecting metal skin 1212 to, but also may simplify assembly of attaching a skin to a frame, and eliminate the need for all of the tooling associated with attaching splice plates. Monolithic construction of metal skin 1212 to first composite laminate 1208 and second composite laminate lock 1210 allows for seating a single monolithic component over frame 1252 and attaching the single monolithic component without requiring the tools, alignment, and adjustments required to assemble and seal various skin and splice components to each other, using without limitation lap joints. Thus, the monolithic construction of metal skin 1212 connected to first composite laminate 1208 and second composite laminate 1210 may require less tooling to attach to frame 1252 and provide a smoother and lighter skin on structure 1250 than may be required or produced by the multi-component spliced skin structure such as without limitation structure 1242 described for FIG. 12B. With reference now to FIG. 12D, FIG. 12D is an illustrative embodiment depicting a zoomed in view of a connection of the metal skin to the composite skin on the structure depicted in FIG. 12C. More specifically, FIG. 12D shows a zoomed in view of an illustrated embodiment of the connection between metal skin 1212 and second composite laminate 1210. The connection between metal skin 1212 and second composite laminate 1210 may be a bond. The bond may be formed by an adhesive. The connection shown in FIG. 12D between metal skin 1212 and second composite laminate 1210 may be representative of the connection between metal skin 1212 and first composite laminate 1208. Transition 1236 may be an example of transition section 25 as shown in FIG. 4.

Metal skin 1212 may be made from stack 1232 of metal sheets, such as metal sheet 1234. Without limitation, each metal sheet 1234 in stack 1232 may be identical to every other metal sheet 1234 in stack 1232. Without limitation, each metal sheet 1234 in stack 1232 may share common features with each other metal sheet 1234, such as without limitation a thickness or a composition. Without limitation, each metal sheet 1234 may be unique from another metal sheet 1234 in stack 1232.

Without limitation, a quantity of metal sheet 1234 included in stack 1232 may be three. Without limitation, a quantity of metal sheet metal sheet 1234 included in metal sheet 1234 may be other than three. Each metal sheet 1234 in stack 1232 may be bonded to each adjacent metal sheet 1234.

Without limitation, second composite laminate 1210 may include four plies of composite for each metal sheet 1234 in stack 1232. Thus, stack 1232 may bond directly to a composite skin without using a splice plate. Each metal sheet 1234 in stack 1232 may be interlaced with composite plies within second composite laminate 1210 in a finger lap joint such that each respective end of each metal sheet 1234 abuts four plies of composite in second composite laminate 1210.

Joining several metal sheet 1234 together may also provide multiple paths to carry a load. Joining multiple metal sheet 1234 together may lower a value for Young's modulus, as compared to a metal plate of the same thickness as stack 1232 made of multiple metal sheet 1234 bonded together, and prevent a critical defect for the metal skin 1212 section covering structure 1202. Bonding several metal sheet 1234 together to form a given thickness, may isolate any defect within a particular metal sheet 1234 from propagating beyond the thickness of that particular metal sheet 1234, and thus help to isolate the defect and/or provide strain relief for the stack 1232 in comparison to a single metal plate of the same thickness as stack 1232.

Likewise, interleaving staggered ends of the titanium sheets in a finger joint with layers of composite plies, and abutting an end of each metal sheet 1234 with layers of composite plies, as shown in FIGS. 12C and 12D, may also lower Young's modulus for the titanium-composite ply joint as compared to a Young's modulus for stack 1232 itself.

In testing, a titanium-composite ply bond transition section 1236 formed with a stack of nine 0.025 inch thick sheets of titanium, bonded together with 0.005 inch adhesive layers interleaved with composite plies to form a finger joint, and an end of each metal sheet 1234 abutted by 4 composite plies may have a yield point under tensile stress that may be 4.92% greater than a yield point under tensile stress for stack 1232 of titanium sheets. Thus, the bond joint depicted by FIG. 12D may have a fracture point stress level that is greater than a fracture point stress level of stack 1232 itself. Thus, if a load were continually increased on stack 1232, transition section 1236, and on first composite laminate 1208 and/or second composite laminate 1210 a structural failure may occur in stack 1232 before transition section 1236 of titanium-composite ply bond joint depicted by FIG. 12D may experience a structural failure. Thus, a bonded joint, without a using a splice plate, as represented in FIG. 12D and FIG. 12C may form a stronger joint, one that can withstand a greater load before structural failure, than a joint formed using a splice plate as shown in FIG. 12B. A bonded joint, without a using a splice plate, as represented in FIG. 12D and FIG. 12C may be a thinner joint than one constructed using a splice plate as shown in FIG. 12C.

Joining metal skin 1212 to first composite laminate 1208 and/or second composite laminate 1210 by using the bonded joint, formed between metal skin 1212 made of bonded titanium sheets abutting composite laminate plies and interleaved in a finger joint, as illustrated in FIG. 12C and in greater detail in FIG. 12D, may form a stronger joint between metal skin 1212 and first composite laminate 1208 and/or second composite laminate 1210 than may be formed by using splice plates as illustrated in FIG. 12B. Joining metal skin 1212 to first composite laminate 1208 and/or second composite laminate 1210 by using the bonded joint, formed between metal skin 1212 made of bonded titanium sheets abutting composite laminate plies and interleaved in a finger joint, as illustrated in FIG. 12C and in greater detail in FIG. 12D, may form a thinner joint as may be formed using composite pad-ups that may without limitation be required to join composite sections, or to strengthen a load carrying capacity for a section of a composite skin, such as without limitation composite skin 1206 in FIG. 12A, or first composite laminate 1208 and/or second composite laminate 1210 as shown in FIG. 12B.

In testing, a titanium-composite ply bond transition section 1236 formed with a stack of nine 0.025 inch thick sheets of titanium, bonded together with 0.005 inch adhesive layers interleaved with composite plies to form a finger joint, and an end of each metal sheet 1234 abutted by 4 composite plies may have a yield point under tensile stress that may be 7.3% greater than a yield point under tensile stress for a single titanium plate that may be tapered and bonded with scarfed carbon fiber reinforced composite plies. Thus, the interleaved finger joint formation, without limitation as shown in FIG. 12D, may provide a stronger joint than a bonded joint of the similar materials but using a metal plate that may be tapered and bonded with composite plies in a scarfed joint configuration.

Stack 1232, using an interleaved finger joint configuration with an adhesive layer between each metal sheet 1234 and each metal sheet 1234 abutting four composite plies, may have: a greater number of bond surfaces, more load paths, a shorter joint length, a lower coefficient of thermal expansion induced stresses, a higher modulus, be stronger, have greater durability, and be easier to manufacture, than a bond joint using similar materials except for the metal being a single plate instead of stack 1232 of metal sheets.

Machining and forming stack 1232 using bonded layers of multiple metal sheet 1234 interleaved with and abutted to composite plies, as shown without limitation in FIG. 12C, FIG. 12D, may overcome problems of deformation when attempting to form a composite metal joint with a single metal plate. Machining and forming stack 1232 using bonded layers of several metal sheet 1234 interleaved with and abutted to composite plies may overcome problems of residual stresses in the joint and warping during cure when attempting to form a composite metal joint with a single metal plate. Without limitation, when stack 1232 may include a quantity of nine metal sheet 1234 made of titanium, using bonded layers of multiple metal sheet 1234 interleaved with and abutted to composite plies, as shown in FIG. 12C, FIG. 12D, instead of forming a bond joint using a single titanium plate tapered bonded into scarfed composite plies, then there may be: 10 bond surfaces instead of 2 bond surfaces, 9 load paths in stack 1232 instead of 1 load path in the single titanium plate, a length of the joint or transition section 1236 may be reduced by one-half, coefficient of thermal expansion induced stresses in the joint may be reduced by one-half, tensile strength may rise by 4.58%, and durability may be increased due to load redistribution among metal sheets and as much as 6% elongation of joint, after yield stress is reached, before failure of the interleaved finger joint.

Some structures may experience changes in temperatures during operation. Without limitation in an illustrative embodiment, an aircraft component, such as without limitation a skin on an aircraft, may experience temperature changes across a range of −65 F to 160 F. Changes in temperature may induce stresses in the component that may be caused by thermal expansion of the component. Thermal expansion cycles, such as without limitation experienced by an aircraft throughout a flight, may increase structural fatigue of the component. To manage thermal stresses in the component, a thickness of the component may need to be increased. To manage thermal stresses a transition material may be needed to provide a transition coefficient of thermal transition between two other materials with respective coefficients of thermal expansion that may not be compatible with each other. A coefficient of thermal expansion for aluminum may not be compatible with a coefficient of thermal expansion for a composite laminate. Thus, in an illustrative embodiment, splice plate 1216, as shown in FIG. 12B, may be used to provide a coefficient of thermal expansion transition between metal skin 1212 if metal skin 1212 may include aluminum when first composite laminate 1208 may include a carbon fiber reinforced ply.

In order to minimize a needed thickness of a component, and thus minimize a weight of the structure, a material with a favorable coefficient of thermal expansion may be preferred for use in the component. A favorable coefficient of thermal expansion may be a coefficient of thermal expansion with a lower value, or may be a value that is favorably compatible with a coefficient of thermal expansion of an adjacent and/or abutting material.

A favorable coefficient of thermal expansion may also reduce thermal stress fatigue in the component. Thus, joining materials, in a manner or using material that reduces the coefficient of thermal expansion of a joint combining components, may reduce a weight and improve a structural life of each respective component and/or the structure formed by the joined components. In an illustrative embodiment, a titanium-composite ply interleaved finger joint as shown for transition section 1236 in FIG. 12D, may have a favorable coefficient of thermal expansion that reduces both weight and fatigue stresses in the joint as compared to the joint shown in FIG. 12B using a splice plate.

Reducing coefficient of thermal expansion induced stresses in the joint by one-half may allow the bond joint to experience twice the heating before disbonding as compared to a bond joint using a single tapered metal plate. Thus, a bond joint, as depicted without limitation in FIGS. 12C and 12D, may withstand twice the heat before disbonding as compared to a joint formed by a tapered metal sheet bonded to a scarfed composite laminate.

Further, each metal sheet 1234 may have a thickness to length ratio that enables metal sheet 1234 to function as a waveguide for nondestructive testing. Without limitation nondestructive testing may be one-sided nondestructive testing. Without limitation, nondestructive testing may be ultrasonic testing. Because ultrasonic flaw detection may not be able to detect a flaw with a thickness less than one-half of the ultrasonic wavelength, the thickness of each metal sheet 1234 may affect an ability of metal sheet 1234 to function as a waveguide. When the thickness of metal sheet 1234 may be less than one wavelength, guided Lamb wave testing may be required such that the Lamb wave fills the entire cross-section of metal sheet 1234.

As a width of a material decreases, to detect inconsistencies within the width of the material, an ultrasonic testing wavelength may need to decrease proportionately. To accommodate the smaller wavelength required to detect an inconsistency within material with a layer thinner than approximately 0.025 inches, a guided wave traveling within material with a layer thinner than approximately 0.025 inches, such as without limitation metal foil type layers, would need to be transmitted at a higher frequency than for a material a layer of about 0.025 inches or more.

Attenuation of a signal in a waveguide is generally proportional to the square of a frequency of the wave (and also a function of material attenuation properties). Hence attempting to transmit ultrasonic waves into thinner sheets of material requires higher frequencies and increases the attenuation of the signal. Thus, at thinner thickness, increased signal attenuation results in reduced lengths of the material that the wave may effectively be used to detect an inconsistency within.

When metal foil layers less than approximately 0.025 inches are used effective distance of ultrasonic testing may drop down to as short as 5 mm, which becomes impractical for non-destructive testing of wing components.

While increasing energy of the transmitted wavelengths may overcome some attenuation and increase an effective testing range for ultrasonic waves beyond 5 mm. A practical working frequency for guided waves may be 150 kHz.

A required voltage required for detection of an inconsistency in a material by a rectangular sensor, where the sensor has no effect on the structure being tested, may be derived from:

$$v = \frac{d_{31} E_p h_p \int\int (\epsilon_x + \epsilon_y) dS}{ab(e_{33}(1 - v_p) - 2d_{31}^2 E_p)} \quad (1)$$

where a, b and h stand for the sensor length, width and thickness, d31 and e33 represent the piezoelectric constants (in m V−1) and the dielectric permittivity at zero stress and Ep and vp denote the piezoceramic Young's modulus and Poisson ratio respectively, and ϵx and ϵy represent surface strains in the directions x and y.

Hence, ultrasonic wave testing energy requirements may be inversely proportional to the square of the magnitude of thickness change in the material, and thus it may be impractical and/or too financially burdensome for most operating environments to be able to conduct ultrasonic testing when a sheet thickness drops below 0.025 inches. Hence, testing indicates that for lengths of material being examined for inconsistencies with ultrasonic waves, in a typical wing of an aircraft, materials of thickness less than approximately 0.025 inches do not support guided wave inspection or monitoring. Thus layer thicknesses typical of foil type metal sheets, which can be an order of magnitude less, are simply not functional as a waveguide for non-destructive testing such as without limitation ultrasonic waves.

Still further, bonded titanium sheets abutting composite laminate plies and interleaved in a finger joint, as illustrated without limitation in FIG. 12C and in greater detail in FIG. 12D, that eliminates a need for any splice plates, may allow for an overall reduction in parts, such as without limitation fasteners, used in construction of the structure. Elimination of parts may simplify the joint between the bonded titanium sheets and abutting composite laminate plies interleaved in a finger joint, and allow for a monolithic design and construction of the structure. Monolithic construction may reduce weight, cost, and production time and/or complexity as compared to a structure that may be formed by connecting metal components to composite components via a splice plate, without limitation as shown in FIG. 12B. Monolithic design and construction may provide a more efficient load alignment along structure 1250 than may be available from a spliced construction such as without limitation FIG. 12B.

With reference now to FIG. 13A and FIG. 13B, FIG. 13A is a cross-sectional side view of an illustrated embodiment depicting a structure similar to the structure depicted in FIG. 12C, but with conductive strip in a stack of metal sheets. FIG. 13B is a cross-sectional side view of an illustrated embodiment depicting a structure similar to the structure depicted in FIG. 12C, but with an integrated heating duct. The embodiments illustrated in FIGS. 13A and 13B may each facilitate a process for de-icing and/or anti-icing a structure.

More specifically, structure 1302 may include frame 1304 covered by a skin that may incorporate conductive strip 1306, first composite laminate 1308, second composite laminate 1310, and stack 1312. Without limitation, frame 1304 may be a section of a skeletal support for structure 1302. Without limitation, when structure 1302 may be a wing, skeletal structure may be a wing box, and frame 1304 may be a rib of the wing. Stack 1312 may include a number of metal sheets. Each metal sheet 1314 may be bonded to each adjacent metal sheet 1314 by a respective adhesive layer. Although two metal sheets, outer metal sheet 1314 and inner metal sheet 1318, are shown in FIGS. 13A and 13B to simplify the illustration, stack 1312 may include different numbers of sheets. Stack 1312 without limitation may include nine or more metal sheets as shown in FIG. 12D above. Stack 1312 may incorporate conductive strip 1306. At least one metal sheet may incorporate conductive strip 1306.

Conductive strip 1306 is configured to function as a ductless heating element for structure 1302. Without limitation a ductless heating element may be an element that may be heated by other than providing heated air through a duct. The conductive section may be configured to receive electromagnetic energy. The conductive section may be configured to generate a surface temperature in outer metal sheet 1314 that may be sufficient for preventing adhesion of ice on outer metal sheet 1314.

Without limitation FIG. 13A shows conductive strip 1306 incorporated into outer metal sheet 1314. Outer metal sheet 1314 may be exposed to moisture. Outer metal sheet 1314 may be in contact with cold air. Conductive strip 1306 may be configured to heat an outer surface of stack 1312. Conductive strip 1306 may be configured to heat stack 1312. Conductive strip 1306 may generate enough heat to prevent ice from accumulating on stack 1312 and/or to melt any ice that may accumulate on stack 1312. Thus, conductive strip 1306 may facilitate stack 1312 functioning as part of a ductless heating element for an anti-icing and/or de-icing process for structure 1302.

Although conductive strip 1306 is shown in FIG. 13A to be in the outer metal sheet 1314, conductive strip 1306 may be located on any part of any metal sheet that may transfer heat to provide anti-ice and/or de-ice capability to outer metal sheet 1314 for stack 1312. Conductive strip 1306 may not be integrated into any metal sheet in stack 1312, but may be configured as an additional strip, that may be connected to any metal sheet in stack 1312 in a manner that may transfer heat to outer metal sheet 1314 and provide anti-ice and/or de-ice capability to stack 1312. Conductive strip 1306 may located in between any metal sheets in stack 1312 that may transfer heat to outer metal sheet 1314 and provide anti-ice and/or de-ice capability to stack 1312.

Without limitation stack 1312 may be part of a wing. Without limitation stack 1312 may be part of a leading edge of a wing. Alternatively, without limitation stack 1312 may be a surface plate for a static air source to an air data system for an aircraft, such that the surface plate may be connected to adjacent composite skin on an aircraft structure, such as without limitation a fuselage or an empennage. With reference now to FIG. 13B, FIG. 13B is a side cross-sectional view of an illustrated embodiment depicting a structure similar to the structure depicted in FIG. 12C, but with an integrated heating duct. Duct 1316 may be formed between inner metal sheet 1318 of stack 1312 and interior sheet 1320. When duct 1316 is added to structure 1302, a forward section of frame 1304 may be reshaped to accommodate interior sheet 1320.

Interior sheet 1320 may be of the same material as inner metal sheet 1318, and may be formed to bond to inner metal sheet 1318 such that inner metal sheet 1318 bonds to first composite laminate 1308 and/or second composite laminate 1310 as part of an interleaved finger joint between stack 1312 and first composite laminate 1308 and/or second composite laminate 1310 as shown above for FIG. 12C. Thus, like inner metal sheet 1318, interior sheet 1320 may be formed of a material that does not galvanically react with first composite laminate 1308 and/or second composite laminate 1310.

Alternatively, interior sheet 1320 may be connected to inner metal sheet 1318 at a location on inner metal sheet 1318 before inner metal sheet 1318 contacts first composite laminate 1308 and/or second composite laminate 1310. Thus, interior sheet 1320 may be made from any material that may avoid a corrosive interaction with inner metal sheet 1318 and may withstand the heated air received in duct 1316 that is sufficient to transfer heat to outer metal sheet 1314 and provide anti-ice and/or de-ice capability to stack 1312. Thus, interior sheet 1320 may be adapted for: preventing a galvanic interaction with a composite laminate; receiving a flow of air and directing the air such that a heat from the air holds outer metal sheet 1314 at a temperature sufficient for at least one of: preventing adhesion of ice on outer metal sheet 1314, and melting ice formed on outer metal sheet 1314.

Although not shown, conductive strip 1306 may be placed on inner metal sheet 1318 and provide heat to air present in duct 1316. Thus, air received by duct 1316 may not need to be heated before entering duct 1316. Similarly, conductive strip 1306 may be located in interior sheet 1320. Likewise some other type of heating element may be present in duct 1316 or connected to interior sheet 1320 to heat air in duct 1316 and provide heat in duct 1316 that may be sufficient to transfer heat to outer metal sheet 1314 and provide anti-ice and/or de-ice capability to stack 1312.

Further, for either or both FIG. 13A and/or FIG. 13B, each member of stack 1312, which may include at least outer metal sheet 1314, inner metal sheet 1318, and/or interior sheet 1320, may have a thickness to length ratio that enables each member of stack 1312 to function as a waveguide for nondestructive testing. Without limitation nondestructive testing may be one-sided nondestructive testing. Without limitation, nondestructive testing may be ultrasonic testing. Because ultrasonic flaw detection may not be able to detect a flaw with a thickness less than one-half of the ultrasonic wavelength, the thickness of each member of stack 1312 may affect an ability of each member of stack 1312 to function as a waveguide. When the thickness of each member of stack 1312 may be less than one wavelength, guided Lamb wave testing may be required such that the Lamb wave fills the entire cross-section of each respective member of stack 1312.

With reference now to FIG. 14A and FIG. 14B, FIG. 14A is a cross-sectional side view of an illustrative embodiment depicting a structure similar to the structure depicted in FIG. 12C. FIG. 14B is a cross-sectional side view of an illustrative embodiment the structure depicted in FIG. 14A, but differs from FIG. 14A by the stack of metal sheets changing its shape.

FIG. 14A depicts structure 1402 with frame 1404 covered with first composite laminate 1406 connected to top side 1408 of frame 1404, second composite laminate 1410 connected to bottom side 1412 of frame 1404, and stack 1414 connected to both first composite laminate 1406 and second composite laminate 1410. Structure 1402 may be an illustrative embodiment of structure 1202 as shown in FIG. 12C.

Structure 1402 may be a wing. Without limitation, frame 1404 may be a section of a skeletal support for structure 1402. Without limitation, when structure 1402 may be a wing, skeletal structure may be a wing box, and frame 1404 may be a rib of the wing. Without limitation, when frame 1404 may be a rib of a wing, top side 1408 may be a flange along a top side of the rib, and bottom side 1412 may be a flange along a bottom side of the rib.

Stack 1414 may be a leading edge of the wing. Stack 1414 may be metal sheets bonded together by an adhesive layer. Each metal sheet 1416 in stack 1414 may be a titanium alloy. Each metal sheet 1416 in stack 1414 may be a shape memory alloy.

FIG. 14B depicts structure 1402 after a shape of stack 1414 has changed. A trigger event may cause stack 1414 to change shape. Stack 1414 may be connected to an electrical source. An electrical current may trigger stack 1414 to change shape.

Stack 1414 may be connected to a heat source. A change of temperature of a metal sheet in stack 1414 may trigger stack 1414 to change shape. The trigger event that may cause stack 1414 to change its shape may be without limitation an electrical current or may be an application of heat.

Further, for either or both FIG. 14A and/or FIG. 14B, each member of stack 1414, which may include any or all of metal sheet 1416, may have a thickness to length ratio that enables each member of stack 1414 to function as a waveguide for nondestructive testing. Without limitation nondestructive testing may be one-sided nondestructive testing. Without limitation, nondestructive testing may be ultrasonic testing. Because ultrasonic flaw detection may not be able to detect a flaw with a thickness less than one-half of the ultrasonic wavelength, the thickness of each member of stack 1414 may affect an ability of each member of stack 1414 to function as a waveguide. When the thickness of each member of stack 1414 may be less than one wavelength, guided Lamb wave testing may be required such that the Lamb wave fills the entire cross-section of each respective member of stack 1414.

With reference now to FIG. 15, FIG. 15 is a cross-sectional side view of an engine with a nozzle containing a memory shape alloy connected to a composite engine turbine section cowl in accordance with an illustrative embodiment. More specifically, nozzle 1500 may have segment 1502 including metal sheet 1504 and metal sheet 1506 bonded to composite structure 1508. Nozzle 1500 may also have a segment 1510 including metal sheet 1512 and metal sheet 1514 bonded to composite structure 1516.

Each metal sheet may be a shape memory alloy that may change a shape of the respective metal sheet. Each metal sheet may change shape in response to a trigger. Thus, segment 1502 may change shape such that an end of segment 1502 may move to positions indicated along arc 1518, such as without limitation position 1524. Similarly, segment 1510 may change shape such that an end of segment 1510 may move to positions indicated along arc 1520, such as without limitation position 1526. Thus, nozzle 1500 may change shape to vary its form and performance from a convergent nozzle through a divergent nozzle.

Segment 1502 may form a stack if metal sheet 1504 and metal sheet 1506 are bonded to each other by a layer of adhesive. Segment 1502 may bond to composite structure 1508 in much the same manner as described above for stack 1232 bonding as an interleaved finger joint to second composite laminate 1210 in FIG. 12B.

Composite structure 1508 may be bonded to composite structure 1516. Composite structure 1508 and composite structure 1516 may be different cross sections of a single structure that is connected to segment 1504 and to segment 1510 of nozzle 1500.

Similar to stack 1414 in FIG. 14B, a trigger event may cause segment 1502 and/or segment 1510 to change shape. Segment 1502 and/or segment 1510 may each be connected to an electrical source, and/or to separate electrical sources, and/or connected under separate control to a single electrical source. An electrical current may trigger segment 1502 and/or segment 1510 to change shape.

Segment 1502 and/or segment 1510 may each be connected to a source of heat, and/or to separate heat sources, and/or connected under separate control to a single heat source. A change of temperature may trigger segment 1502 and/or segment 1510 to change shape. The trigger event that may cause segment 1502 and/or segment 1510 to change shape may be without limitation an electrical current or may be an application of heat.

Further, for either or both segment 1502 and/or segment 1510, each member of stack 1414, which may include at least one of metal sheet 1504, metal sheet 1506, metal sheet 1512, and/or metal sheet 1514, may have a thickness to length ratio that enables either or both segment 1502 and/or segment 1510 to function as a waveguide for nondestructive testing. Without limitation nondestructive testing may be one-sided nondestructive testing. Without limitation, nondestructive testing may be ultrasonic testing. Because ultrasonic flaw detection may not be able to detect a flaw with a thickness less than one-half of the ultrasonic wavelength, the thickness of each member of either or both segment 1502 and/or segment 1510 may affect an ability of each respective member of either or both segment 1502 and/or segment 1510 to function as a waveguide. When the thickness of each member of either or both segment 1502 and/or segment 1510 may be less than one wavelength, guided Lamb wave testing may be required such that the Lamb wave fills the entire cross-section of each respective member of either or both segment 1502 and/or segment 1510.

With reference now to FIG. 16, FIG. 16 is a perspective view of an illustrative embodiment depicting a titanium-composite ply joint connecting an aluminum structure to a composite structure. Aluminum structure 1602 may connect to titanium-composite ply joint 1604 via fasteners 1606 mounted through openings 1608 in brackets 1610. A quantity of fasteners 1606 and openings 1608 may vary from the quantity shown in FIG. 16.

Composite structure 1616 may connect to titanium-composite ply joint 1604 via fasteners 1612 mounted through openings 1614 in brackets 1610. A quantity of fasteners 1612 and openings 1614 may vary from the quantity shown in FIG. 16. For illustrative clarity, fasteners 1606 and fasteners 1612 are only shown for the aft most of brackets 1610. Brackets 1610 may be made of a material that may not react galvanically with composite structure 1616. Without limitation, brackets 1610 may be made from titanium, a titanium alloy, or a coated titanium.

Without limitation, fasteners 1606 may be of a different type from fasteners 1612. Without limitation, fasteners 1606 may be of a different composition than fasteners 1612.

Titanium-composite ply joint 1604 may form an end section of composite structure 1616. Without limitation, titanium-composite ply joint 1604 may be formed similar to the description for FIG. 12D above. Composite structure 1616 may include a graphite fiber. Composite structure 1616 may be formed such that an end section of composite structure 1616 includes stack 1618. Stack 1618 may be made of metal sheets bonded together by an adhesive layer between each sheet, such as described without limitation for FIG. 12C or 12D above. Stack 1618 may be titanium sheets. An end of each respective metal sheet in stack 1618 that is opposite, from the end of each respective metal sheet in stack 1618 that is bonded to composite structure 1616 in the interleaved finger joint, may without limitation align with each other to form a single edge 1620 of stack 1618.

Aluminum structure 1602 may be aligned and connected to stack 1618 such that aluminum structure 1602 may not be in contact with composite structure 1616, but rather contacts stack 1618 portion of titanium-composite ply joint 1604. Thus, aluminum structure 1602 is prevented from contacting composite structure 1616 via stack 1618 being bonded into composite structure 1616 and connecting to aluminum structure 1602.

Although not shown in FIG. 16, aluminum structure 1602 may connect directly to stack 1618 in titanium-composite ply joint 1604 without using brackets 1610. Connection of aluminum structure 1602 to stack 1618 without using brackets 1610 may be made using a connection device, and adhesive, or by another bonding method. The connection device may be similar to fasteners 1606. When no brackets 1610 are used, fasteners 1612 are not needed. Thus, titanium-composite ply joint 1604 may join aluminum structure 1602 to composite structure 1616 without a carbon fiber in composite structure 1616 contacting aluminum structure 1602. Thus, titanium-composite ply joint 1604 may join aluminum structure 1602 to composite structure 1616 in a manner that prevents galvanic corrosion of aluminum structure 1602, and uses fewer fasteners that a method using a splice plate as shown in FIG. 12B.

In accordance with an illustrative embodiment, composite structure 1616 in FIG. 16 may represent a composite wing structure and aluminum structure 1602 may represent a wing mounting structure. Initial testing indicates that that when using titanium-composite ply joint 1604 (Ti-Ply Joint) as compared to previous methods of joining composite structures directly to titanium structures, that aluminum structures, such as without limitation aluminum structure 1602, can replace a previously required use of titanium for the same function as aluminum structure 1602. Thus, for a typical wide-bodied aircraft wing root, connecting a composite wing to a wing box, using titanium-composite ply joint 1604 may reduce a weight of the wing root joint by 250-350 pounds as compared to joining the composite wing directly to a titanium structure. Further, machining of the titanium structure to receive and fasten directly to the composite wing may be more difficult and expensive than machining required for aluminum structure 1602 to receive and secure to stack 1618 as shown in FIG. 16.

Further, when connecting a composite sheet, such as without limitation composite structure 1616, directly to a titanium structure serving the function of aluminum structure 1602, the composite sheet typically required a pad-up, or an increase in thickness of the composite sheet along the length of the connection of the composite sheet to the titanium structure. Additionally, connections of components to stack 1618 provides the benefit of well known load, fatigue, and/or failure characteristics for each metal sheet being used in stack 1618. Thus, a selection of an alloy composition for stack 1618 as well as a thickness of each metal sheet in stack 1618, may eliminate a current practice of adding thickness to composite joint components to provide a reinforcement against potentially unpredictable load, fatigue, and/or failure characteristics.

Additionally, stack 1618 may extend without connecting to another structure, such as without limitation aluminum structure 1602, thus forming a titanium edge for a composite structure, such as without limitation composite structure 1616. Forming an edge of the composite structure 1616 with stack 1618 of titanium composition via using titanium-composite ply joint 1604, versus using a continuation of a composite composition forming composite structure 1616 to form the edge, may provide an edge having an impact resistance toughness and/or resiliency at the edge using a thickness of stack 1618 that may be one-half a thickness that would be needed for the same impact resistance toughness and/or resiliency of composite structure 1616 without the titanium edge. Thus, where a opening in a purely composite skinned aircraft, such as without limitation for a door frame, with a ¼ inch thick composite skin may require a pad-up that increases a thickness of the composite skin to ½ inch for the edge of the composite skin around the door frame in order to meet a required impact resistance, an edge formed of titanium via using titanium-composite ply joint 1604 may allow for the edge around the door to remain substantially the same ¼ inch thickness as the composite skin. A further benefit of using titanium-composite ply joint 1604, to form an edge for a composite skin or structure, such as without limitation composite structure 1616, may be eliminating a weight and a manufacturing time and/or tooling, and/or costs, needed to add reinforcement and associated fasteners the edge for attaching a door or hatch to seal an opening that may be formed at the edge.

Further, each member of stack 1618 may have a thickness to length ratio that enables each member of stack 1618 to function as a waveguide for nondestructive testing. Without limitation nondestructive testing may be one-sided nondestructive testing. Without limitation, nondestructive testing may be ultrasonic testing. Because ultrasonic flaw detection may not be able to detect a flaw with a thickness less than one-half of the ultrasonic wavelength, the thickness of each member of stack 1618 may affect an ability of each member of stack 1618 to function as a waveguide. When the thickness of each member of stack 1618 may be less than one wavelength, guided Lamb wave testing may be required such that the Lamb wave fills the entire cross-section of each respective member of stack 1618.

Turning now to FIGS. 17A, 17B, and 17C. In FIG. 17A an illustration of a perspective cross-section of a titanium-composite ply joint, from view A in FIG. 16, of a stack of metal sheets incorporating a Griesson disbond limiter and bonded to a composite laminate is depicted in accordance with an illustrative embodiment. In FIG. 17B, FIG. 17A is modified to show an alternative configuration of the Griesson disbond limiter. In FIG. 17C, FIG. 17B is modified to show another alternative configuration of the Griesson disbond limiter.

Referring now to FIG. 17A, the perspective cross-sectional view of titanium-composite ply joint 1700 may correspond without limitation to view A of titanium-composite ply joint 1604 as shown in FIG. 16. Stack 1702 may correspond without limitation to stack 1618 of metal sheets as shown by view A in FIG. 16. Composite structure 1704 may without limitation correspond to composite structure 1616 as shown in FIG. 16. Griesson disbond limiter 1706 may include a number of segmenters, with each segmenter including a number of gaps in a number of metal sheets in stack 1702 of metal sheets.

A value of effectiveness of disbond limiting provided by Griesson disbond limiter 1706 may be measured by a rise in a value of a load required to propagate a disbond among the sheets comprising titanium-composite ply joint 1700. Testing has shown that Griesson disbond limiter 1706 may raise the value of the load required to propagate the disbond in a bond such as bonds in titanium-composite ply joint 1700 by as much as 57%. An amount of disbond limitation provided by Griesson disbond limiter 1706 may be determined by distance 1712 between first segmenter 1708 and second segmenter 1710, a width of first segmenter 1708, a width of second segmenter 1710, and/or by the number of and relationship between portions removed from each metal sheet within stack 1702. Each segmenter of Griesson disbond limiter 1706 may be an expansion joint formed into stack 1702 and/or 1704. The expansion joint, or segmenter, may without limitation be formed into stack 1702 without extending into composite structure 1704. Without limitation the expansion joint, or segmenter, may extend through stack 1702 and into composite layers of composite structure 1704.

As shown without limitation in FIG. 17A, segmenters forming Griesson disbond limiter 1706, such as first segmenter 1708 and second segmenter 1710, may without limitation be oriented substantially perpendicular to an edge of composite structure 1704, such as edge 1734 shown in FIG. 17C.

First segmenter 1708 and/or second segmenter 1710 may be formed by removing some portion of at least one metal sheet in stack 1702. As shown in FIG. 17A, after leaving upper metal sheet 1714 intact, gap 1716 has been cut into every other metal sheet in first segmenter 1708, while in second segmenter 1710 gap 1718 has been cut into each metal sheet that does not have a gap in first segmenter 1708, including upper metal sheet 1714.

With reference to FIG. 17B, FIG. 17B modifies FIG. 17A to show an alternative configuration of the Griesson disbond limiter. In FIG. 17B, Griesson disbond limiter 1706 distance 1712 between first segmenter 1708 and second segmenter 1710 differs from distance 1712 of FIG. 17A by being smaller, such that first segmenter 1708 is closer to second segmenter 1710 than as shown in FIG. 17A. Griesson disbond limiter 1706 of FIG. 17B also differ from Griesson disbond limiter 1706 of FIG. 17A by gap 1716 only being present in two metal sheets for first segmenter 1708 and gap 1718 only being present in two metal sheets in second segmenter 1710 that are not the same metal sheets that have gaps in first segmenter. Griesson disbond limiter 1706 in FIG. 17B also differs from Griesson disbond limiter 1706 of FIG. 17A by adding third segmenter 1720. Third segmenter 1720 may have gap 1722 present in each metal sheet that does not have any gap in first segmenter 1708 and second segmenter 1710. Further, third segmenter 1720 may be centered over a rib 1724 of a structure, such as without limitation web 1254 of structure 1250 as shown in FIG. 12C.

With reference to FIG. 17C, in FIG. 17C, FIG. 17B is modified to show another alternative configuration of Griesson disbond limiter 1706. In FIG. 17C, Griesson disbond limiter 1706 may include only first segmenter 1708 with gap 1726 being cut into every metal sheet in stack 1702. Further, gap 1726 may extend through transition section 1728 of 1700 into composite structure 1704 and terminate in by transitioning into opening 1730.

Combinations of configurations shown in FIGS. 17A-17C may also be applied, such that without limitation stack 1702 may include some of gap 1716, gap 1718, and/or gap 1722, while transition section 1728 and composite structure 1704 may include gap 1726 that extends through a full thickness of stack 1702 and through a full thickness of composite structure 1704, and may transition to include opening 1730. Limitations to disbonding of sheets within stack 1702 of metal sheets, and/or of metal sheets to composite structure, and/or of laminate sheets within composite structure may be altered by varying a quantity and relative positioning of gaps within stack 1702. In other words, Griesson disbond limiter 1706 may include configurations of various segmenters and gaps that may be variations on those presented in FIG. 17A-C.

Longitudinal axis 1732 of first segmenter 1708 and gap 1726 may be oriented at a normal angle to edge 1734 of composite structure 1704, as shown without limitation in FIG. 17C. Limitations to disbonding of sheets within stack 1702 of metal sheets, and/or of metal sheets to composite structure, and/or of laminate sheets within composite structure may be altered by varying an angle of each segmenter relative to the edge of the composite structure. Longitudinal axis 1732 of first segmenter 1708 and gap 1726 may be oriented at an angle that may be at an angle other than normal to edge 1734, such as without limitation 15, 30, or 45 degrees to edge 1734 of composite structure 1704. Opening 1730 may extend through composite structure 1704. Composite structure 1704 may have a circular shape. Composite structure 1704 may have another shape such as without limitation at least one of: an oval, an elongated oval, an "L" shape, and a flanged tee.

With reference to FIG. 18, FIG. 18 is a flowchart of a process for bonding a metal skin to a composite skin without using a splice plate depicted in accordance with an illustrative embodiment. Process 1800 may include steps 1802-1822. Process 1800 may begin by integrating a conductive section into a first metal sheet (Operation 1802). The conductive section may be a part of a system to prevent accumulation and/or remove accumulation of ice on the metal skin. The conductive section may be configured to receive electromagnetic energy.

Process 1800 may include bonding the first metal sheet to a second metal sheet via an adhesive layer to form a stack (Operation 1804). The stack may include an inner sheet, a middle sheet, and an outer sheet. Thus, there may be a first adhesive layer between the inner sheet and the middle sheet, and a second adhesive layer between middle sheet and the outer sheet. Each sheet may include titanium. Each metal sheet in the stack may have a length that differs from an adjoining metal sheet. Each metal sheet may have a thickness that allows the sheet to function as a waveguide for non-destructive testing. Process 1800 may include interlacing each sheet in the stack with plies of a respective composite laminate in a finger lap joint (Operation 1806). Each respective end of the metal sheet may respectively abut four plies of the respective composite laminate. Each composite laminate may include a fiber. The fiber reinforcing any composite laminate may include graphite.

Process 1800 may include bonding a first composite laminate to a first end of the stack without using a splice plate (Operation 1808). Process 1800 may include bonding a second composite laminate to a second end of the stack without using a splice plate (Operation 1810). Process 1800 may include forming the stack to a shape. (Operation 1812). The shape may be a curve. The shape may form a leading edge for a structure, such as without limitation a leading edge for a wing.

Process 1800 may include increasing a load carrying capacity of the structure via increasing a height of a rib of a frame of the structure relative to a height of a rib of a splice skinned structure with a substantially equal size and shape as the structure (Operation 1814). Process 1800 may include decreasing a weight of the structure via decreasing a width of the rib of the frame of the structure relative to a width of the rib of the splice skinned structure with a substantially equal size and shape as the structure (Operation 1816).

Process 1800 may also include connecting the first composite laminate to a top side of the frame of the structure (Operation 1818). Process 1800 may include connecting the second composite laminate to a bottom side of the frame of the structure (Operation 1820). Process 1800 may include integrating an interior sheet onto an inner sheet of the stack to form a duct. (Operation 1822)

With reference to FIG. 19, a flowchart of a process for inhibiting galvanic corrosion of an aluminum structure connected, without using a splice plate, to a composite structure is depicted in accordance with an illustrative embodiment. Process 1900 may include steps 1902-1906. Process 1900 may begin by bonding a first metal sheet to a second metal sheet via an adhesive layer to form a stack (Operation 1902). Process 1900 may include bonding the composite structure to a first end of a stack of metal sheets in a fingered lap joint, without using the splice plate (Operation 1904). Process 1900 may include connecting the stack to the aluminum structure such that the aluminum structure does not contact the composite structure (Operation 1906).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed:

1. An apparatus configured as a structure comprising a skin, the skin comprising:
   a stack comprising metal sheets;
   a first section comprising a first composite laminate, the first composite laminate connected to a top side of a frame of the structure, and bonded to a first end of the stack to form a first composite-to-metal joint, wherein the metal sheets and the first composite laminate are non-interleaving except in the first composite-to-metal joint; and
   a second section comprising a second composite laminate, the second composite laminate connected to a bottom side of the frame, and bonded to a second end of the stack to form a second composite-to-metal joint, wherein the metal sheets and the second composite laminate are non-interleaving except in the second composite-to-metal joint.

2. The apparatus of claim 1, wherein the first section, the stack, and the second section form a monolithic shell for the structure and wherein the skin further comprises the monolithic shell.

3. The apparatus of claim 1, wherein the structure comprises a wing box, and wherein the metal sheets form a leading edge of a wing comprising the wing box, the leading edge being able to withstand, without material failure, at least twice an impact force relative to an alternate leading edge consisting of only a composite skin.

4. The apparatus of claim 1, wherein each of the first composite-to-metal joint and the second composite-to-metal joint is configured as a finger lap joint.

5. The apparatus of claim 4, wherein each finger lap joint comprises four plies of composite laminate abutting each metal sheet in the stack, each metal sheet in the stack being: 0.025 inches thick, and bonded to an adjacent metal sheet by a layer of adhesive.

6. The apparatus of claim 4, wherein a first finger lap joint at the first end of the stack comprises interleaved plies of the first composite laminate and the metal sheets.

7. The apparatus of claim 1, wherein the stack comprises a shape memory alloy that changes, in response to a trigger, a shape of an edge of the structure.

8. The apparatus of claim 1, wherein the metal sheets comprise titanium sheets.

9. The apparatus of claim 1, wherein each metal sheet in the stack is identical to every other metal sheet in the stack.

10. The apparatus of claim 1, wherein each metal sheet is bonded to each adjacent metal sheet.

11. The apparatus of claim 1, wherein the second composite laminate includes four plies of composite for each metal sheet.

12. The apparatus of claim 1, wherein the metal sheets comprise titanium sheets and wherein staggered ends of the titanium sheets are interleaved in a finger joint with layers of plies of the first composite laminate.

13. The apparatus of claim 12, wherein an end of each metal sheet is abutted with respective layers of the first composite laminate.

14. The apparatus of claim 12, wherein the metal sheets are bonded together.

15. The apparatus of claim 14, wherein the metal sheets bonded together isolate a defect within a particular metal sheet.

16. The apparatus of claim 1, wherein multiple metal sheets are joined together to lower a Young's modulus of the stack as compared to a Young's modulus of a metal plate of a same thickness as the stack.

17. The apparatus of claim 1, wherein at least one of a size and a shape of each metal sheet is unique from another metal sheet in the stack.

18. The apparatus of claim 1, wherein each metal sheet in the stack comprises at least one of a common thickness and a common composition with each other metal sheet in the stack.

19. The apparatus of claim 1, wherein each metal sheet in the stack comprises a common thickness.

20. The apparatus of claim 1, wherein each metal sheet in the stack comprises a common composition.

21. The apparatus of claim 1, wherein the stack comprises three metal sheets.

22. An apparatus configured as a structure comprising a skin, the skin comprising:
   a stack comprising metal sheets;
   a first section comprising a first composite laminate, the first composite laminate connected to a top side of a frame of the structure, and bonded without a splice plate, to a first end of the stack;
a second section comprising a second composite laminate, the second composite laminate connected to a bottom side of the frame, and bonded to a second end of the stack; and
a composite-to-metal bond at each end of the stack configured as a finger lap joint, wherein each finger lap joint comprises four plies of composite laminate abutting each metal sheet in the stack, each metal sheet in the stack being: about 0.025 inches thick, and bonded to an adjacent metal sheet by a layer of adhesive, wherein the metal sheets and the first composite laminate are non-interleaving except in a first composite-to-metal joint at the first end of the stack, and wherein the metal sheets and the second composite laminate are non-interleaving except in a second composite-to-metal joint at the second end of the stack,
wherein the first section, the stack, and the second section, form a monolithic shell for the structure,
wherein the structure comprises a wing box, and the metal sheets form a leading edge of a wing comprising the wing box, the leading edge being able to withstand, without material failure, at least twice an impact force relative to an alternate leading edge comprising only a composite skin, and
wherein the stack comprises a shape memory alloy that changes, in response to a trigger, a shape of an edge of the structure.

* * * * *